US005493179A

United States Patent [19]
Tanizoe

[11] Patent Number: 5,493,179
[45] Date of Patent: Feb. 20, 1996

[54] IMAGE DISPLAY APPARATUS, COMPUTER APPARATUS, COMPUTER SYSTEM EQUIPPED WITH BOTH OF THEM AND CONTROL METHOD OF COMPUTER SYSTEM

[75] Inventor: Hideki Tanizoe, Nagasaki, Japan

[73] Assignee: Mitsubishi Denki Kabushiki Kaisha, Tokyo, Japan

[21] Appl. No.: 224,590

[22] Filed: Apr. 7, 1994

[30] Foreign Application Priority Data

Dec. 15, 1993 [JP] Japan .................................. 5-315567

[51] Int. Cl.$^6$ ............................................. H01J 29/06
[52] U.S. Cl. .................... 315/8; 315/368.27; 315/370; 364/571.01; 395/100
[58] Field of Search ..................... 315/8, 364, 368.18, 315/368.27, 370; 364/571.01, 550, 514; 348/607, 609; 358/319, 328

[56] References Cited

U.S. PATENT DOCUMENTS

| | | | |
|---|---|---|---|
| 4,458,178 | 7/1984 | Tenney et al. | 315/8 |
| 5,170,096 | 12/1992 | Kang et al. | 315/8 |

FOREIGN PATENT DOCUMENTS

| | | |
|---|---|---|
| 2-305293 | 12/1990 | Japan. |
| 5-83719 | 4/1993 | Japan. |

Primary Examiner—Robert J. Pascal
Assistant Examiner—Reginald A. Ratliff
Attorney, Agent, or Firm—Burns, Doane, Swecker & Mathis

[57] ABSTRACT

A computer system executing a degaussing operation of a display monitor, an input-prohibiting/permitting operation of a display-adjusting key and a shifting operation to a waiting state is provided. In the computer system of the present invention, indicating signals indicating the degaussing operation of the display monitor, the input-prohibiting/permitting operation of the display-adjusting key and the shifting operation to the waiting state are transmitted from the host computer through a communicating means by means of the manipulation of the keyboard and the like. Then the display monitor executes each operation mentioned above on the basis of the indicating signals. Accordingly, in the computer system of the present invention, each operation described above can be easily executed by means of manipulations of a manipulation-inputting means such as a keyboard and the like connected to the host computer at the hands of an operator.

36 Claims, 14 Drawing Sheets

IMAGE DISPLAY APPARATUS, COMPUTER APPARATUS, COMPUTER SYSTEM EQUIPPED WITH BOTH OF THEM AND CONTROL METHOD OF COMPUTER SYSTEM

BACKGROUND OF THE INVENTION

1. Field of the Invention

This invention relates to an image display apparatus (hereinafter referred to as "display monitor") having an image display means such as a cathode ray tube (hereinafter referred to as "CRT" for short) and the like, which displays images, a computer apparatus (hereinafter referred to as "host computer") for controlling the display monitor, a computer system equipped with the display monitor and the host computer and a control method of the computer system equipped with the display monitor and the host computer.

2. Description of the Prior Art

FIG. 1 is a block diagram showing a prior art display monitor, a prior art host computer and a prior art computer system equipped with both of them. In FIG. 1, reference numeral 1 designates a display monitor (image display apparatus) for displaying images; reference numeral 2 designates a host computer (computer apparatus) for controlling the display monitor; reference numeral 3 designates a keyboard (manipulation-inputting means) for inputting various indicating signals to the host computer 2; reference sign S1 designates video signals outputted from the host computer 2; reference sign S2 designates synchronizing signals outputted from the host computer 2; reference numeral 4 designates an input terminal for receiving the video signals S1; reference numeral 5 designates an input terminal for receiving the synchronizing signals S2; reference numeral 6 designates a CRT (cathode ray tube) for displaying images according to video signals; reference numeral 7 designates the cathode electrode of the CRT 6; reference numeral 8 designates the heater electrode of the CRT 6; reference numeral 9 designates the anode terminal of the CRT 6; reference numeral 10 designates the deflecting yoke of the CRT 6; reference numeral 11 designates the degaussing coil (degaussing means) of the CRT 6; reference numeral 12 designates a video-signal-amplifying circuit (video-signal-supplying means) for receiving the video signals S1, and for deforming and amplifying the video signals S1 to a form suitable for displaying images on the CRT 6, and then for outputting the deformed and amplified video signals S1 to the cathode electrode 7 of the CRT 6; reference numeral 13 designates a deflecting and high-voltage-impressing circuit (driving-voltage-impressing means) for receiving the synchronizing signals S2 and for impressing deflecting voltages to the deflecting yoke 10 of the CRT 6 and high voltages to the anode terminal 9 of the CRT 6 respectively; reference numeral 14 designates a power source circuit (driving-voltage-impressing means) for supplying power voltages for actuating the video-signal-amplifying circuit 12, the deflecting and high-voltage-impressing circuit 13, a degaussing circuit (degaussing means) 15 and a controlling circuit (controlling means) 17 respectively, and for supplying electric power for heating to the heater electrode 8 of the CRT 6; reference numeral 15 designates the degaussing circuit for supplying a degaussing current from the power source circuit 14 to the degaussing coil 11 of the CRT 6; reference sign 15r designates a relay installed in the degaussing circuit 15; reference numeral 16 designates a switch group (adjusting means) for manipulating the input of instructions concerning the brightness, chromaticity and faceplate sizes of the images displayed on the CRT 6, degaussing operations and the like to the controlling circuit 17; and reference numeral 17 designates the controlling circuit for receiving the synchronizing signals S2 and the manipulated inputs from the switch group 16 and further receiving the supplement of the power voltage from the power source circuit 14, and then for supplying each controlling signal to the video-signal-amplifying circuit 12, the deflecting and high-voltage-impressing circuit 13, the power source circuit 14 and the degaussing circuit 15.

FIG. 2 is a block diagram showing an internal construction of the controlling circuit 17. In FIG. 2, reference numeral 20 designates a one-chip microcomputer (hereinafter referred to as "MC" for short) having a built-in read only memory (hereinafter referred to as "ROM" for short) 201 and a built-in random access memory (hereinafter referred to as "RAM" for short) 202; and the HSYNC terminal and the VSYNC terminal of the MC 20 are connected to the input terminal 5 for the synchronizing signals S2, and horizontal synchronizing signals (hereinafter referred to as "H synchronizing signals" for short) and vertical synchronizing signals (hereinafter referred to as "V synchronizing signals" for short) are inputted to the HSYNC terminal and the VSYNC terminal respectively. Moreover, the switch group 16 are connected to input terminals 203, and the manipulated inputs of the switch group 16 are inputted from the input terminals 203. Furthermore, the output terminal of degaussing signals (hereinafter referred to as "DEGAUSS" signals), which control the degaussing operation of the CRT 6, of MC 20 is connected to the relay-driving input terminal of the degaussing circuit 15; and the output terminal of suspending signals (hereinafter referred to as "SUSPEND" signals), which suspends the power voltage supply to the deflecting and high-voltage-impressing circuit 13 from the power source circuit 14, and the output terminal of complete off signals (hereinafter referred to as "COMPLETE OFF" signals), which suspends the power voltage supply to the heater electrode 8 of the CRT 6, too, are connected to the power source circuit 14. Reference numeral 21 designates an electrically erasable/programmable ROM (hereinafter referred to as "E$^2$PROM" for short) connected to the MC 20; reference numeral 22 designates a D/A converter, which converts digital signals from the MC 20 into analogue signals, connected to the MC 20. The output terminal of contrast signals (hereinafter referred to as "CONTRAST" signals), which adjust the brightness of the images displayed on the CRT 6, of the D/A converter 22 is connected to the brightness-controlling input terminal of the video-signal-amplifying circuit 12; and each output terminal of red signals' gain-adjusting signals (hereinafter referred to as "R-GAIN" signals), green signals' gain-adjusting signals (hereinafter referred to as "G-GAIN" signals) and blue signals' gain-adjusting signals (hereinafter referred to as "B-GAIN" signals) of the D/A converter 22 is connected to the red-gain-controlling input terminal, the green-gain-controlling input terminal and the blue-gain-controlling terminal of the video-signal-amplifying circuit 12 respectively. The output terminals of the horizontal-width-adjusting signals (hereinafter referred to as "H-SIZE" signals), which adjusts the horizontal widths of the images displayed on the CRT 6, and the vertical-width-adjusting signals (hereinafter referred to as "V-SIZE" signals), which adjusts the vertical widths of the images, of the D/A converter 22 are connected to the horizontal-width-controlling input terminal and the vertical-width-controlling input terminal of the deflecting and high-voltage-impressing circuit 13 respectively.

FIG. 3 is a block diagram showing an internal construction of the host computer 2. In FIG. 3, reference numeral 31 designates a central processing unit (hereinafter referred to as "CPU" for short) (a central controlling means, an indicating-signal-outputting means) which executes various kinds of arithmetic processes; and reference numeral 32 designates a clock-generating circuit for generating clock signals, and the clock-generating circuit 32 supplies the generated clock signals to the CPU 31. Reference sign CB designates a control bus for giving and receiving control signals between the CPU 31 and other construction elements; reference sign DB designates a data bus for giving and receiving data between the CPU 31 and other construction elements; and reference sign AB designates an address bus for giving and receiving address signals between the CPU 31 and other construction elements. Reference numeral 33 designates a RAM (memorizing means) for memorizing data and the like temporarily; reference numeral 34 designates a ROM (memorizing means) for memorizing system programs for controlling the operation of the host computer 2 and various kinds of data over a long period of time; and reference numeral 35 designates a memory controller for controlling the operation of the RAM 33 and the ROM 34. Reference numeral 36 designates a bus controller for controlling the operation of signals on the control bus CB, the data bus DB and the address bus AB, the bus controller 36 being connected to the control bus CB, the data bus DB, the address bus AB and the memory controller 35. Reference numeral 37 designates an interruption controller for controlling interruption operation; reference numeral 38 designates a timer for time-controlling; reference numeral 30 designates a mouse (manipulation-inputting means) for inputting indicating signals for executing necessary selection on the CRT 6 of the display monitor 1; and reference numeral 39 designates a keyboard/mouse controller (terminal-controlling means) for receiving manipulated input signals from the keyboard 3 and the mouse 30. Reference numeral 41 designates a hard disc apparatus (memorizing means) for memorizing system programs for controlling the operation of the host computer 2, and the like; reference numeral 40 designates a disc controller (terminal-controlling means) for controlling the hard disc apparatus 41; reference numeral 43 designates a printer; reference numeral 42 designates a serial port (communicating means) for inputting and outputting bit-serial data for the communication in conformity to the RS 232C standard, the serial port 42 being connected to the printer 43, a modem (not shown in FIG. 3) and the like. Reference numeral 44 designates a video controller (terminal-controlling means) transmitting synchronizing signals and video signals for controlling the display monitor 1; and reference numeral 45 designates an expanding slot for adding additional functions.

Next, the operation will be described. FIG. 4 is a flow-chart showing a part of the operation of the MC 20 of the controlling circuit 17 of the display monitor 1. Hereafter, the operation of these prior art display monitor 1, host computer 2 and computer system will be described according to FIG. 4.

When the electric power of the display monitor 1 is turned on, the MC 20 reads out the image-controlling data such as brightness data, chromaticity data, faceplate size data of the images and the like memorized in the E²PROM 21 and writes them into the RAM 202 (STEP ST60). Next, MC 20 judges whether both the H synchronizing signals and the V synchronizing signals to be inputted from the video controller 44 of the host computer 2 are actually inputted or not (STEP ST61), and the MC 20 executes the COMPLETE OFF mode process when both of the synchronizing signals are not inputted (STEP ST62) . In this COMPLETE OFF mode process, the MC 20 makes both the SUSPEND signal output and COMPLETE OFF signal output, which are ordinarily in the "L" level, be in the "H" level. The SUSPEND signal output changing to the "H" level makes the power source circuit 14 suspend the supplement of the power voltages to be supplied to the deflecting and high-voltage-impressing circuit 13, and the COMPLETE OFF signal output changing to the "H" level makes the power source circuit 14 suspend the supplement of the power voltage to be supplied to the heater electrode 8 of the CRT 6, too. Since the deflecting and high-voltage-impressing circuit 13 suspends the operation thereof and the power supplement to the heater is also suspended by this operation of the power source circuit 14, the CRT 6 is placed in a completely suspended state. When the COMPLETE OFF mode processes end, the MC 20 returns to the STEP ST61 and judges the existence of the H synchronizing signals and the V synchronizing signals again.

When the MC 20 judges that either or both of the H synchronizing signals and the V synchronizing signals are inputted to the MC 20 as a result of the judgement in the STEP ST61, the MC 20 judges whether only the V synchronizing signals have not been inputted or not (STEP ST63). When only the V synchronizing signals are not inputted, the MC 20 executes the SUSPEND mode processes (STEP ST64). In this SUSPEND mode, the MC 20 makes only the SUSPEND signal output be in the "H" level, and the MC 20 suspends the supplement of the power voltages of the power source circuit 14 to the deflecting and high-voltage-impressing circuit 13 alone and the MC 20 does not suspend the supplement of power voltage to the heater electrode 8 of the CRT 6. Hereby, the power consumption in the heater of the CRT 6 remains in the same level that it consumes in the ordinary driving thereof, and the consumption power is larger than that in the COMPLETE OFF mode processes. However, the SUSPEND mode processes have an advantage in that images can be begun to be displayed faster when the computer system returns to the ordinary operation thereof. When the processes of the SUSPEND mode end, the MC 20 returns to the STEP ST61 and judges the existence of the synchronizing signals and V synchronizing signals.

Moreover, the host computer 2 suspends the supplement of both the H synchronizing signals and the V synchronizing signals or only the V synchronizing signals in synchronizing signals S2 to be supplied to the display monitor 1, when the manipulation inputs from the keyboard 3 are not received for a predetermined time period in the state which the electric power thereof are turned on. The display monitor 1 moves to either waiting states of the COMPLETE OFF mode or the SUSPEND mode by detecting the variation of the synchronizing signals S2.

When both the H synchronizing signals and the V synchronizing signals are inputted to the MC 20 or only the V synchronizing signals are inputted to the MC 20, the MC 20 executes setting processes as an ordinary operation mode of the CRT 6 (STEP ST65). In this setting processes, the MC 20 cause the COMPLETE OFF signal output and the SUSPEND signal output to be in the "L" level and it causes all the output voltages from the power source circuit 14 to be in their ordinary operation states.

Next, the MC 20 examines the existence of the manipulation inputs from the switch group 16 (STEP ST66), and the MC 20 makes the W-flag, which is a requesting flag of writing data to the E²PROM 21, be in "1" when some manipulated inputs exist (STEP ST67). Successively, the MC 20 examines whether the DEGAUSS switch in the switch group 16 is turned on or not, and the MC 20 executes the DEGAUSS outputting processes when the manipulation turning on the DEGAUSS switch was made (STEP ST69). In this DEGAUSS output processes, the MC 20 holds the DEGAUSS output signals in the "H" level for a predetermined time period. Hereby, the relay 15r in the degaussing circuit 15 is turned on for the time period when the DEGAUSS output signal is in the "H" level, and a degaussing current flows in the degaussing coil 11 of the CRT 6 from the power source circuit 14, then the CRT 6 is degaussed. After the DEGAUSS output processes are over, the MC 20 executes the processes of the STEP ST74.

In the case where the manipulation turning the DEGAUSS switch in the switch group 16 on is not detected, the MC 20 executes the increase or decrease processes of the data in the RAM 202 according to the manipulated input of the switch group 16 except for the DEGAUSS switch (STEP ST70). The MC 20 outputs the increase-or-decrease-processed data to the D/A converter 22 from the RAM 202 (STEP ST74), thereby changing the output voltages of the output signals corresponding to the manipulated inputs among each output signal of the CONTRAST output signals, the R-GAIN output signals, the G-GAIN output signals, the B-GAIN output signals, the H-SIZE output signals and the V-SIZE output signals of the D/A converter 22.

In the case where the inputting manipulation of the switch group 16 is not detected, the MC 20 examines whether the W flag is "1" or not (STEP ST71). If the W flag is not "1", namely in the case where the W flag is "0", the MC 20 executes the STEP ST74 process; and if the W flag is "1", the MC 20 writes the data on the RAM 202 into the E$^2$PROM 21 (STEP ST73), and then the MC 20 resets the W flag to "0" after writing the data (STEP ST73). Thus, the manipulated inputs of the switch group 16 are stored in the E$^2$PROM 21 and reserved therein. Next, the MC 20 outputs the data in the RAM 202 to the D/A converter 22 (STEP ST74), then the D/A converter 22 outputs controlling signals corresponding to the manipulated inputs made last to the video-signal-amplifying circuit 12. Thus, the CRT 6 continues to display images in the same displaying conditions. The MC 20 again examines the existence of the H synchronizing signals and the V synchronizing signals (STEP ST61) and continues the operation thereof after its data outputting process to the D/A converter 22.

Since the prior art display monitor, the prior art host computer, the prior art computer system and the prior art control method of the computer system were constructed as mentioned above, they had problems as follows. That is, (1) To adjust accurately for adjusting the brightness or chromaticity of the display monitor or in case of changing the location place or the direction of the display monitor, it is required to execute the degaussing operation of its CRT. To degauss the CRT, an operator had to manipulate the DEGAUSS switch installed in the body of the display monitor, that is to say he could not manipulate the switch by using a keyboard, so the manipulation of that switch was troublesome.

(2) There were some cases that the adjustments of the display monitor were deviated from the standard or the appropriate displaying states to the object of its usage by the misoperation of an operator after a serviceman or an equipment-maintaining person in charge set the brightness, the chromaticity or the faceplate size of the display monitor. In such cases, it required much labor to restore the display monitor to the appropriate displaying state.

(3) An ordinary host computer had no function to suspend the supply of the H synchronizing signals and V synchronizing signals, and it required the equipment of some special hardware to install the suspension function in the host computer. Then, the installation of the function complicated the structure of the host computer and it was also one of the causes of raising the manufacturing cost of the host computer. Besides, it was also required on the display monitor side, to install some hardware for detecting the existence of the synchronizing signals. Thus the structure of the display monitor was made more complicated and the manufacturing cost thereof was increased.

SUMMARY OF THE INVENTION

In view of the foregoing, it is an object of the present invention to provide a display monitor which can degauss its CRT at the hands of an operator by his or her manipulation of a manipulation-inputting means such as a keyboard, a mouse and the like which is connected to a host computer.

It is another object of the present invention to provide a display monitor which can degauss its CRT at the hands of an operator by an indicating signal from a host computer corresponding to the manipulation of a manipulation-inputting means such as a keyboard, a mouse and the like.

It is a further object of the present invention to provide a display monitor which can nullify the adjusting manipulations of an image-displaying means which are made by mistake or are adjusted into inappropriate states by manipulating a manipulation-inputting means such as a keyboard, a mouse and the like which is connected to a host computer, the display monitor being able to prevent or modify operator's misadjustments easily.

It is a further object of the present invention to provide a display monitor which can easily prevent or modify misadjustments of the displaying states of its image-displaying means by an indicating signal from a host computer corresponding to the manipulation of a manipulation-inputting means such as a keyboard, mouse and the like.

It is a further object of the present invention to provide a display monitor which can shift its image-displaying means to an operation-waiting state of low power-consumption cheaply without complicating the structures of a host computer and the display monitor itself when the manipulation of a manipulation-inputting means such as a keyboard, a mouse and the like of the host computer is not detected for a predetermined time period.

It is a further object of the present invention to provide a display monitor which can shift its CRT to an operation-waiting state of low power-consumption with a simple and cheap construction.

It is a further object of the present invention to provide a display monitor which can shift its CRT to an operation-waiting state of low power-consumption, from which the CRT can return to its ordinary operating state at once, by an indicating signal from a host computer corresponding to the manipulation of a manipulation-inputting means such as a keyboard, a mouse and the like.

It is a further object of the present invention to provide a display monitor which can shift its CRT to an operation-waiting state of low power-consumption, in which the CRT does not consume any electric power almost perfectly, by an indicating signal from a host computer corresponding to the manipulation of a manipulation-inputting means such as a keyboard, a mouse and the like.

It is a further object of the present invention to provide a display monitor to which a host computer can communicate an indicating signal, which shifts the display monitor in an operation-waiting state thereof, from the host computer with a widely usable communication system using fewer communications lines, the display monitor being able to shift its image-displaying means to the operation-waiting state of low power-consumption with a simple and cheap structure.

It is a further object of the present invention to provide a display monitor to which a host computer can realize the communication of an indicating signal, which shifts the display monitor in an operation-waiting state thereof, from the host computer with a simple controlling logic in a securely controllable communication system, the display monitor being able to shift its image-displaying means to the operation-waiting state of low power-consumption with a simple and cheap structure.

It is a further object of the present invention to provide a display monitor to which a host computer can communicate an indicating signal, which shifts the display monitor in an operation-waiting state thereof, from the host computer with a communication system widely applicable to the transmission system of the host computer side, the display monitor being able to shift its image-displaying means to the operation-waiting state of low power-consumption with a simple and cheap structure.

It is a further object of the present invention to provide a host computer which can degauss the CRT of a display monitor at the hands of an operator by manipulating a manipulation-inputting means such as a keyboard, a mouse and the like which is connected to the host computer.

It is a further object of the present invention to provide a host computer which can nullify the adjusting manipulations of the image-displaying means of a display monitor which are made by mistake or are adjusted into inappropriate states by manipulating a manipulation-inputting means such as a keyboard, a mouse and the like which is connected to the host computer, the host computer being able to prevent or modify operator's misadjustments easily.

It is a further object of the present invention to provide a host computer which can shift the image-displaying means of a display monitor to an operation-waiting state of low power-consumption cheaply without complicating the structures of the host computer and the display monitor when a manipulation-inputting means such as a keyboard, a mouse and the like of the host computer is not manipulated for a predetermined time period.

It is a further object of the present invention to provide a host computer being able to shift the CRT of a display monitor to an operation-waiting state of low power-consumption with a simple and cheap structure.

It is a further object of the present invention to provide a host computer which can shift the CRT of a display monitor to an operation-waiting state of low power-consumption, from which the CRT can return to its ordinary operating state at once, by an indicating signal from the host computer corresponding to the manipulation of a manipulation-inputting means such as a keyboard, a mouse and the like.

It is a further object of the present invention to provide a host computer which can shift the CRT of a display monitor to an operation-waiting state of low power-consumption, in which the CRT does not consume any electric power almost perfectly, by an indicating signal from the host computer corresponding to the manipulation of a manipulation-inputting means such as a keyboard, a mouse and the like.

It is a further object of the present invention to provide a host computer which can communicate an indicating signal, which shifts a display monitor in an operation-waiting state thereof, from the host computer to the display monitor with a widely usable communication system using fewer communications lines, the host computer being able to shift the image-displaying means of the display monitor to the operation-waiting state of low power-consumption with a simple and cheap structure.

It is a further object of the present invention to provide a host computer which can realize the communication of an indicating signal, which shifts a display monitor in an operation-waiting state thereof, from the host computer to the display monitor with a simple controlling logic in a securely controllable communication system, the host computer being able to shift the image-displaying means of the display monitor to the operation-waiting state of low power-consumption with a simple and cheap structure.

It is a further object of the present invention to provide a computer system which can degauss the CRT of a display monitor at the hands of an operator by manipulating a manipulation-inputting means such as a keyboard, a mouse and the like which is connected to a host computer.

It is a further object of the present invention to provide a computer system which can nullify the adjusting manipulations of the image-displaying means of a display monitor which are made by mistake or are adjusted into inappropriate states by manipulating a manipulation-inputting means such as a keyboard, a mouse and the like which is connected to a host computer, the computer system being able to prevent or modify operator's misadjustments easily.

It is a further object of the present invention to provide a computer system which can shift the image-displaying means of a display monitor to an operation-waiting state of low power-consumption cheaply without complicating the structures of a host computer and the display monitor when a manipulation-inputting means such as a keyboard, a mouse and the like of the host computer is not manipulated for a predetermined time period.

It is a further object of the present invention to provide a computer system being able to shift the CRT of a display monitor to an operation-waiting state of low power-consumption with a simple and cheap construction.

It is a further object of the present invention to provide a computer system which can shift the CRT of a display monitor to an operation-waiting state of low power-consumption, from which the CRT can return to its ordinary operating state at once, by an indicating signal from a host computer corresponding to the manipulation of a manipulation-inputting means such as a keyboard, a mouse and the like.

It is a further object of the present invention to provide a computer system which can shift the CRT of a display monitor to an operation-waiting state of low power-consumption, in which the CRT does not consume any electric power almost perfectly, by an indicating signal from a host computer corresponding to the manipulation of a manipulation-inputting means such as a keyboard, a mouse and the like.

It is a further object of the present invention to provide a computer system which can communicate an indicating signal, which shifts a display monitor to an operation-waiting state thereof, from a host computer to the display monitor with a widely usable communication system using fewer communications lines, the computer system being able to shift the image-displaying means of the display monitor to the operation-waiting state of low power-consumption with a simple and cheap structure.

It is a further object of the present invention to provide a computer system which can realize the communication of an indicating signal, which shifts a display monitor to an operation-waiting state thereof, from a host computer to the display monitor with a simple controlling logic in a securely controllable communication system, the computer system being able to shift the image-displaying means of the display monitor to the operation-waiting state of low power-consumption with a simple and cheap structure.

It is a further object of the present invention to provide a computer system which can easily select either or both of the selection images of degaussing the CRT of a display monitor and nullifying the adjusting manipulations of the CRT displayed on the CRT by a manipulation-inputting means such as a keyboard, a mouse and the like, the computer system being able to manipulate the degaussing or the nullifying of the adjusting manipulations at the hands of an operator quickly and easily.

It is a further object of the present invention to provide a control method of a computer system which can degauss the CRT of a display monitor at the hands of an operator by manipulating a manipulation-inputting means such as a keyboard, a mouse and the like which is connected to a host computer.

It is a further object of the present invention to provide a control method of a computer system which can nullify adjusting manipulations of the image-displaying means of a display monitor which are made by mistake or are adjusted into inappropriate states by manipulating a manipulation-inputting means such as a keyboard, a mouse and the like which is connected to a host computer, the control method of the computer system being able to prevent or modify operator's misadjustments easily.

It is a further object of the present invention to provide a control method of a computer system which can shift the image-displaying means of a display monitor to an operation-waiting state of low power-consumption cheaply without complicating the structures of a host computer and the display monitor when a manipulation-inputting means of the host computer such as a keyboard, a mouse and the like is not manipulated for a predetermined time period.

It is a further object of the present invention to provide a control method of a computer system being able to shift the CRT of a display monitor to an operation-waiting state of low power-consumption with a simple and cheap structure.

It is a further object of the present invention to provide a control method of a completer system which can shift the CRT of a display monitor to an operation-waiting state low power-consumption, from which the CRT can return to its ordinary operating state at once, by arm indicating signal from a host computer corresponding to the manipulation of a manipulation-inputting means such as a keyboard, a mouse and the like with a simple and cheap structure.

It is a further object of the present invention to provide a control method of a computer system which can shift the CRT of a display monitor to an operation-waiting state of low power-consumption, in which the CRT does not consume any electric power almost perfectly, by an indicating signal from a host computer corresponding to the manipulation of a manipulation-inputting means such as a keyboard, a mouse and the like with a simple and cheap structure.

It is a further object of the present invention to provide a control method of a computer system which can communicate an indicating signal, which shifts a display monitor in an operation-waiting state thereof, from a host computer to the display monitor with a widely usable communication system using fewer communications lines, the control method of the computer system being able to shift the image-displaying means of the display monitor to the operation-waiting state of low power-consumption with a simple and cheap structure.

It is a further object of the present invention to provide a control method of a computer system which can realize the communication of an indicating signal, which shifts a display monitor to an operation-waiting state thereof, from a host computer to the display monitor with a simple controlling logic in a securely controllable communication system, the control method of the computer system being able to shift the image-displaying means of the display monitor to the operation-waiting state of low power-consumption with a simple and cheap structure.

According to the first aspect of the present invention, for achieving the above-mentioned objects, there is provided a display monitor comprising a communicating means with a host computer, and a controlling means for controlling a degaussing means for degaussing a CRT on the basis of a transmitted signal from the host computer received by the communicating means.

As stated above, the display monitor according to the first aspect of the present invention degausses the CRT thereof on the basis of the transmitted signal transmitted from the host computer. Consequently, the degaussing of the CRT can be done at the hands of an operator by manipulating a manipulation-inputting means such as a keyboard, a mouse and the like which is connected to the host computer.

According to the second aspect of the present invention, there is provided a display monitor where a transmitted signal from a host computer received by a communicating means with the host computer is constituted of a degaussing-indicating signal.

As stated above, the display monitor according to the second aspect of the present invention uses the degaussing-indicating signal as the transmitted signal from the host computer received by the communicating means with the host computer. Consequently, the CRT of the display monitor can be degaussed at the hands of an operator by the indicating signal from the host computer corresponding to the manipulation of a manipulation-inputting means such as a keyboard, a mouse and the like.

According to the third aspect of the present invention, there is provided a display monitor comprising a communicating means with a host computer, and a controlling means for nullifying manipulations of an adjusting means for manually adjusting a displaying state of an image-displaying means on the basis of a transmitted signal from the host computer received by the communicating means.

As stated above, the display monitor according to the third aspect of the present invention receives the transmitted signal from the host computer with the communicating means thereof, and nullifies the manipulations of the adjusting means for adjusting the displaying state of the image-displaying means on the basis of the received transmitted signal. Consequently, the adjusting manipulations of the display monitor made by mistake or adjusted into an inappropriate state can be nullified by the manipulations of a manipulation-inputting means such as a keyboard, a mouse and the like which is connected to the host computer, so the misadjustments of an operator can be easily prevented or modified.

According to the fourth aspect of the present invention, there is provided a display monitor where a transmitted signal from a host computer received by a communicating means with the host computer is constituted of a manipulation-input-prohibition-indicating signal.

As stated above, the display monitor according to the fourth aspect of the present invention receives the manipulation-input-prohibition-indicating signal nullifying the manipulations of an adjusting means for adjusting the displaying state of an image-displaying means from the host computer, and nullifies the manipulations of the adjusting means. Consequently, the operator's misadjustments of the displaying state of the image-displaying means can be easily prevented or modified by the indicating signal from the host computer corresponding to the manipulation of a manipulation-inputting means such as a keyboard, a mouse and the like.

According to the fifth aspect of the present invention, there is provided a display monitor comprising a communicating means with a host computer, and a controlling means for controlling a switching means for switching an image-displaying means to the state of low power-consumption on the basis of a transmitted signal from the host computer received by the communicating means.

As stated above, the display monitor according to the fifth aspect of the present invention receives the transmitted signal from the host computer with the communicating means thereof, and switches the image-displaying means to the state of low power-consumption on the basis of the received transmitted signal. Consequently, the image-displaying means can be shifted to an operation-waiting state of low power-consumption cheaply without complicating the structures of the host computer and the display monitor itself.

According to the sixth aspect of the present invention there is provided a display monitor comprising a communicating means with a host computer, and a controlling means for controlling a switching means for switching a CRT to the state of low power-consumption on the basis of a transmitted signal from the host computer received by the communicating means.

As stated above, the display monitor according to the sixth aspect of the present invention receives the transmitted signal from the host computer with the communicating means, and changes the CRT to the state of low power-consumption. Consequently, the CRT can be shifted to an operation-waiting state of low power-consumption cheaply without complicating the structures of the host computer and the display monitor itself.

According to the seventh aspect of the present invention there is provided a display monitor where a transmitted signal from a host computer received by a communicating means with the host computer is constituted of an output-prohibition-indicating signal for prohibiting outputting output voltages to be supplied to the deflecting and high-voltage impressing circuit of a CRT among the output voltages of a driving-voltage-impressing means for impressing voltages for driving the CRT on the CRT.

As stated above, the display monitor according to the seventh aspect of the present invention receives the transmitted signal from the host computer with the communicating means, and prohibits outputting the voltages to be supplied to the deflecting and high-voltage impressing circuit of the CRT on the basis of the received transmitted signal. Consequently, the CRT can be shifted to an operation-waiting state of low power-consumption from which the CRT can return to its ordinary operating state at once by the indicating signal from the host computer corresponding to the manipulation of a manipulation-inputting means such as a keyboard, a mouse and the like.

According to the eighth aspect of the present invention, there is provided a display monitor where a transmitted signal from a hose computer received by a communicating means with the host computer is constituted of an output-prohibition-indicating signal for prohibiting outputting an output voltage to be supplied to the heater of a CRT among the output voltages of a driving-voltage-impressing means for impressing voltages for driving the CRT on the CRT.

As stated above, the display monitor according to the eighth aspect of the present invention receives the transmitted signal from the host computer with the communicating means, and prohibits outputting the voltage to be supplied to the heater of the CRT on the basis of the received transmitted signal. Consequently, the CRT can be shifted to an operation-waiting state of low power-consumption in which the CRT does not consume any electric power almost perfectly by the indicating signal from the host computer corresponding to the manipulation of a manipulation-inputting means such as a keyboard, a mouse and the like.

According to the ninth aspect of the present invention, there is provided a display monitor comprising a controlling means for controlling a switching means for switching an image-displaying means to a low power-consuming state thereof, and whose communicating means with a host computer is constituted of a nonsynchronous type serial-parallel converter.

As stated above, the display monitor according to the ninth aspect of the present invention switches its image-displaying means to the low power-consuming state thereof by communicating with the host computer with the nonsynchronous type serial-parallel converter. Consequently, the communication with the host computer using a widely usable communication system using fewer communications lines can be executed, and the display monitor can shift its image-displaying means to the operation-waiting state of low power-consumption with a simple and cheap structure.

According to the tenth aspect of the present invention, there is provided a display monitor comprising a controlling means for controlling a switching means for switching an image-displaying means to a low power-consuming state thereof, and whose communicating means with a host computer is constituted of a synchronous type serial-parallel converter.

As stated above, the display monitor according to the tenth aspect of the present invention switches its image-displaying means to the low power-consuming state thereof by communicating with the host computer with the synchronous type serial-parallel converter. Consequently, the communication with the host computer using a widely usable communication system using fewer communications lines can be executed, and the display monitor can shift its image-displaying means to the operation-waiting state of low power-consumption with a simple and cheap structure.

According to the eleventh aspect of the present invention, there is provided a display monitor comprising a controlling means for controlling a switching means for switching an image-displaying means to a low power-consuming state thereof, and whose communicating means with a host computer is constituted of a synchronous-and-nonsynchronous-combined type serial-parallel converter.

As stated above, the display monitor according to the eleventh aspect of the present invention switches its image-displaying means to the low power-consuming state thereof by communicating with the host computer with the synchronous-and-nonsynchronous-combined type serial-parallel converter. Consequently, the communication of an indicating signal to shift the display monitor to an operation-waiting state thereof from the host computer to the display monitor with a communication system widely applicable to the transmission system of the host computer side, and the display monitor can shift its image-displaying means to the operation-waiting state of low power-consumption with a simple and cheap structure.

According to the twelfth aspect of the present invention, there is provided a host computer comprising an indicating-signal-outputting means for outputting an indicating signal for degaussing the CRT of a display monitor through a communicating means for communicating with the display monitor.

As stated above, the host computer according to the twelfth aspect of the present invention outputs the indicating signal for degaussing the CRT of the display monitor with the indicating-signals-outputting means thereof through the communicating means for communicating with the display monitor. Consequently, the degaussing of the CRT can be done at the hands of an operator by manipulating a manipulation-inputting means such as a keyboard, a mouse and the like which is connected to the host computer.

According to the thirteenth aspect of the present invention, there is provided a host computer comprising an indicating-signal-outputting means for outputting an indicating signal for nullifying the manipulations of an adjusting means for manually adjusting the displaying state of the image-displaying means of a display monitor through a communicating means for communicating with the display monitor.

As stated above, the host computer according to the thirteenth aspect of the present invention outputs the indicating signal for nullifying the manipulations of the adjusting means for manually adjusting the displaying state of the image-displaying means of the display monitor through the communicating means for communicating with the display monitor. Consequently, the adjusting manipulations of the display monitor made by mistake or adjusted into inappropriate situations can be nullified by the manipulation of a manipulation-inputting means such as a keyboard, a mouse and the like which is connected to the host computer, so the misadjustments of an operator can be easily prevented or modified.

According to the fourteenth aspect of the present invention, there is provided a host computer comprising an indicating-signal-outputting means for outputting an indicating signal for switching the image-displaying means of a display monitor to a low power-consuming state thereof through a communicating means for communicating with the display monitor.

As stated above, the host computer according to the fourteenth aspect of the present invention outputs the indicating signal for switching the image-displaying means of the display monitor through the communicating means for communicating with the display monitor. Consequently, the image-displaying means can be shifted to an operation-waiting state of low power-consumption cheaply without complicating the structures of the host computer and the display monitor itself when the manipulations of a manipulation-inputting means such as a keyboard, a mouse and the like of the host computer are not done for a predetermined time period.

According to the fifteenth aspect of the present invention, there is provided a host computer comprising an indicating-signal-outputting means for outputting an indicating signal for switching the CRT of a display monitor to a low power-consuming state thereof through a communicating means for communicating with the display monitor.

As stated above, the host computer according to the fifteenth aspect of the present invention outputs the indicating signal for switching the CRT of the display monitor to the low power-consuming state through the communicating means for communicating with the display monitor. Consequently, the CRT can be shifted to an operation-waiting state of low power-consumption with a simple and cheap structure.

According to the sixteenth aspect of the present invention, there is provided a host computer where an indicating signal for switching the CRT of a display monitor to a low power-consuming state is constituted of an indicating signal for prohibiting impressing voltages to be supplied to the deflecting and high-voltage-impressing circuit of the CRT.

As stated above, in the host computer according to the sixteenth aspect of the present invention, the indicating signal for switching the CRT of the display monitor to the low power-consuming state prohibits impressing the voltages to be supplied to the deflecting and high-voltage-impressing circuit of the CRT. Consequently, the CRT of the display monitor can be shifted to an operation-waiting state from which the CRT can return to its ordinary operating state at once by the indicating signal from the host computer corresponding to the manipulation of a manipulation-inputting means such as a keyboard, a mouse and the like.

According to the seventeenth aspect of the present invention, there is provided a host computer where an indicating signal for switching the CRT of a display monitor to a low power-consuming state is constituted of an indicating signal for prohibiting impressing a voltage to be supplied to the heater of the CRT.

As described above, in the host computer according to the seventeenth aspect of the present invention, the indicating signal for switching the CRT of the display monitor to the low power-consuming state prohibits impressing the voltage to be supplied to the heater of the CRT. Consequently, the CRT of the display monitor can be shifted to an operation-waiting state in which the CRT does not consume any electric power almost perfectly by the indicating signal from the host computer corresponding to the manipulation of a manipulation inputting means such as a keyboard, a mouse and the like.

According to the eighteenth aspect of the present invention, there is provided a host computer where a communicating means for transmitting an indicating signal for switching the image-displaying means of a display monitor to a low power-consuming state is constituted of a nonsynchronous type serial transmitter.

As described above, in the host computer according to the eighteenth aspect of the present invention, the indicating signal for switching the image-displaying means of the display monitor to the low power-consuming state is transmitted by the nonsynchronous type serial transmitter. Consequently, the communication of the indicating signal for shifting the display monitor to an operation-waiting state of low power-consumption from the host computer to the display monitor can be executed with a widely usable communication system using fewer communications lines, and the image-displaying means of the display monitor can be shifted to the operation-waiting state of low power-consumption with a simple and cheap structure.

According to the nineteenth aspect of the present invention, there is provided a host computer where a communicating means for transmitting an indicating signal for switching the image-displaying means of a display monitor to a low power-consuming state thereof is constituted of a synchronous type serial transmitter.

As stated above, in the host computer according to the nineteenth aspect of the present invention, the indicating signal for switching the image-displaying means of the display monitor to the low power-consuming state thereof is transmitted by the synchronous type serial-parallel converter. Consequently, the communication of the indicating signal for shifting the display monitor to an operation-waiting state from the host computer to the display monitor can be realized by a simple controlling logic in a securely controllable communication system, and the image-displaying means of the display monitor can be shifted to the operation-waiting state of low power-consumption with a simple and cheap structure.

According to the twentieth aspect of the present invention, there is provided a computer system comprising a host computer provided with an indicating-signal-outputting means for outputting an indicating signal for degaussing the CRT of a display monitor through a communicating means for communicating with the display monitor, and a display monitor provided with a controlling means for controlling a degaussing means for degaussing the CRT on the basis of the indicating signal from the host computer received by the communicating means with the host computer.

As stated above, in the computer system according to the twentieth aspect of the present invention, the indicating signal for degaussing the CRT of the display monitor is transmitted from the host computer, and the display monitor degausses the CRT on the basis of the indicating signal from the host computer. Consequently, the degaussing of the CRT can be done at the hands of an operator by manipulating a manipulation-inputting means such as a keyboard, a mouse and the like which is connected to the host computer.

According to the twenty-first aspect of the present invention, there is provided a computer system comprising a host computer provided with an indicating-signal-outputting means for outputting an indicating signal for nullifying the manipulations of an adjusting means for manually adjusting the displaying state of the image-displaying means of a display monitor through a communicating means for communicating with the display monitor, and the display monitor provided with a controlling means for nullifying the manipulations of the adjusting means for manually adjusting the displaying state of the image-displaying means on the basis of the indicating signal from the host computer received by the communicating means with the host computer.

As stated above, in the computer system according to the twenty-first aspect of the present invention, the host computer outputs the indicating signal for nullifying the manipulations of the adjusting means for manually adjusting the displaying state of the image-displaying means of the display monitor through the communicating means for communicating with the display monitor, and the display monitor nullifies the manipulation of the adjusting means for adjusting manually the displaying state of the image-displaying means on the basis of the indicating signal from the host computer received by the communicating means with the host computer. Consequently, the adjusting manipulations of the display monitor made by mistake or adjusted into inappropriate state can be nullified by the manipulation of a manipulation-inputting means such as a keyboard, a mouse and the like which is connected to the host computer, so the misadjustments of an operator can be easily prevented or modified.

According to the twenty-second aspect of the present invention, there is provided a computer system comprising a host computer provided with an indicating-signal-outputting means for outputting an indicating signal for switching the image-displaying means of a display monitor to a low power-consuming state thereof through a communicating means for communicating with the display monitor, and the display monitor provided with a controlling means for controlling a switching means for switching the image-displaying means to the low power-consuming state on the basis of the indicating signal from the host computer received by the communicating means with the host computer.

As stated above, in the computer system according to the twenty-second aspect of the present invention, the host computer outputs the indicating signal for switching the image-displaying means of the display monitor through the communicating means for communicating with the display monitor, and the display monitor switches the image-displaying means to the low power-consuming state on the basis of the indicating signal from the host computer received by the communicating means with the host computer. Consequently, the image-displaying means of the display monitor can be shifted to an operation-waiting state of low power-consumption cheaply without complicating the structures of the host computer and the display monitor when the manipulations of a manipulation-inputting means such as a keyboard, a mouse and the like of the host computer are not done for a predetermined time period.

According to the twenty-third aspect of the present invention, there is provided a computer system comprising a host computer provided with an indicating-signal-outputting means for outputting an indicating signal for switching the CRT of a display monitor to a low power-consumption state through a communicating means for communicating with the display monitor, and the display monitor provided with a controlling means for controlling a switching means for switching the CRT to the low power-consuming state on the basis of the indicating signal from the host computer received by the communicating means with the host computer.

As stated above, in the computer system according to the twenty-third aspect of the present invention, the host computer outputs the indicating signal for switching the CRT of the display monitor to the low power-consuming state through the communicating means for communicating with the display monitor, and the display monitor switches the CRT to the low power consuming state on the basis of the indicating signal from the host computer received by the communicating means with the host computer. Consequently, the CRT can be shifted to an operation-waiting state of low power-consumption with a simple and cheap structure.

According to the twenty-fourth aspect of the present invention, there is provided a computer system where an indicating signal from a host computer for switching the CRT of a display monitor to a low power-consuming state thereof is constituted of an indicating signal for prohibiting impressing voltages to be supplied to the deflecting and high-voltage-impressing circuit of the CRT.

As stated above, in the computer system according to the twenty-fourth aspect of the present invention, the indicating signal from the host computer for switching the CRT of the display monitor to the low power-consuming state thereof prohibits impressing the voltages to be supplied to the deflecting and high-voltage-impressing circuit of the CRT. Consequently, the CRT of the display monitor can be shifted to an operation-waiting state from which the CRT can return to its ordinary operating state at once by the indicating signal from the host computer corresponding to the manipulation of a manipulation-inputting means such as a keyboard, a mouse and the like.

According to the twenty-fifth aspect of the present invention, there is provided a computer system where an indicating signal from a host computer for switching the CRT of a display monitor to a low power-consuming state thereof is constituted of an indicating signal for prohibiting impressing a voltage to be supplied to the heater of the CRT.

As described above, in the computer system according to the twenty-fifth aspect of the present invention, the indicating signal from the host computer for switching the CRT of the display monitor to the low power-consuming state thereof prohibits impressing the voltage to be supplied to the heater of the CRT. Consequently, the CRT of the display monitor can be shifted to an operation-waiting state in which the CRT does not consume any electric power almost perfectly by the indicating signal from the host computer corresponding to the manipulation of a manipulation-inputting means such as a keyboard, a mouse and the like.

According to the twenty-sixth aspect of the present invention, there is provided a computer system where a communicating means of a display monitor and a communicating means of a host computer transmits an indicating signal for switching the image-displaying means of the display monitor to a low power-consuming state thereof with an asynchronous type serial communication system.

As described above, in the computer system according to the twenty-sixth aspect of the present invention, the communicating means of the display monitor and the communicating means of the host computer transmits the indicating signal for switching the image-displaying means of the display monitor to the low power-consuming state thereof with the asynchronous type serial communication system. Consequently, the communication of the indicating signal for shifting the display monitor to an operation-waiting state of low power-consumption thereof from the host computer to the display monitor can be executed with a widely usable communication system using fewer communications lines, and the image-displaying means of the display monitor can be shifted to the operation-waiting state of low power-consumption with a simple and cheap structure.

According to the twenty-seventh aspect of the present invention, there is provided a computer system where a communicating means of a display monitor and a communicating means of a host computer transmits an indicating signal for switching the image-displaying means of the display monitor to a low power-consuming state thereof with a synchronous type serial communication system.

As stated above, in the computer system according to the twenty-seventh aspect of the present invention, the communicating means of the display monitor and the communicating means of the host computer transmits the indicating signal for switching the image-displaying means of the display monitor to the low power-consuming state thereof. Consequently, the communication of the indicating signal for shifting the display monitor to an operation-waiting state thereof from the host computer to the display monitor can be realized by a simple controlling logic in a securely controllable communication system, and the image-displaying means of the display monitor can be shifted to the operation-waiting state of low power-consumption with a simple and cheap structure.

According to the twenty-eighth aspect of the present invention, there is provided a computer system comprising a displaying means for displaying at least one selection image between a selection image for degaussing the CRT of a display monitor and a selection image for nullifying the manipulations of an adjusting means for manually adjusting the displaying state of the displaying faceplate of the CRT on the CRT, and a selecting means for selecting one of the selection images by manipulating a manipulation-inputting means for manually inputting indicating signals into a host computer.

As stated above, in the computer system according to the twenty-eighth aspect of the present invention, at least one selection image between the selection image for degaussing the CRT of the display monitor and the selection image for nullifying the manipulations of the adjusting means for manually adjusting the displaying state of the displaying faceplate of the CRT is displayed on the CRT, and one of the selection images is selected by the manipulation of the manipulation-inputting means for manually inputting the indicating signals. Consequently, either or both of the selection images of degaussing the CRT of the display monitor and nullifying the adjusting manipulations of the CRT displayed on the CRT can be easily selected by the manipulation-inputting means such as a keyboard, a mouse and the like, and the manipulations of the degaussing or the nullifying of the adjusting manipulations at the hands of an operator can be done quickly and easily.

According to the twenty-ninth aspect of the present invention, there is provided a control method of a computer system comprising an inputting step inputting an indicating signal for degaussing the CRT of a display monitor to a host computer, a transmitting step transmitting the inputting signal inputted at the inputting step from the host computer to the display monitor, and a degaussing step degaussing the CRT on the basis of the indicating signal transmitted at the transmitting step.

As stated above, in the control method of the computer system according to the twenty-ninth aspect of the present invention, the indicating signal for degaussing the CRT of the display monitor is inputted to the host computer, and the inputted indicating signal is transmitted from the host computer to the display monitor, then the CRT is degaussed on the basis of the transmitted indicating signal. Consequently, the degaussing of the CRT can be done at the hands of an operator by manipulating a manipulation-inputting means such as a keyboard, a mouse and the like which is connected to the host computer.

According to the thirtieth aspect of the present invention, there is provided a control method of a computer system comprising an inputting step inputting an indicating signal for nullifying adjusting manipulations for adjusting the displaying state of the displaying faceplate of the image-displaying means of a display monitor to a host computer, a transmitting step transmitting the indicating signal inputted at the inputting step from the host computer to the display monitor, and a nullifying step nullifying adjusting manipulations for adjusting the displaying state of the displaying faceplate of the image-displaying means on the basis of the indicating signal transmitted at the transmitting step.

As stated above, in the control method of the computer system according to the thirtieth aspect of the present invention, the indicating signal for nullifying the adjusting manipulations for adjusting the displaying state of the displaying faceplate of the image-displaying means of the display monitor is inputted to the host computer, and the inputted indicating signal is transmitted from the host computer to the display monitor, then the adjusting manipulations for adjusting the displaying state of the displaying faceplate of the image-displaying means are nullified on the basis of the transmitted indicating signal. Consequently, the adjusting manipulations of the display monitor made by mistake or adjusted into inappropriate state can be nullified by the manipulation of a manipulation-inputting means such as a keyboard, a mouse and the like which is connected to the host computer, so the misadjustments of an operator can be easily prevented or modified.

According to the thirty-first aspect of the present invention, there is provided a control method of a computer system comprising a generating step generating an indicating signal for switching the image-displaying means of a display monitor to a low power-consuming state thereof when manipulation-inputting to a host computer is not done for a predetermined time period, a transmitting step transmitting the indicating signal generated at the generating step from the host computer to the display monitor, and a switching step switching the image-displaying means to the low power-consuming state thereof on the basis of the indicating signal transmitted at the transmitting step.

As stated above, in the control method of the computer system according to the thirty-first aspect of the present invention, the indicating signal for switching the image-displaying means of the display monitor to the low power-consuming state thereof when the manipulation-inputting to the host computer is not done for the predetermined time period is generated, and the generated indicating signal is transmitted from the host computer to the display monitor, then the image-displaying means is switched to the low power-consuming state thereof on the basis of the transmitted indicating signal. Consequently, the image-displaying means of the display monitor can be shifted to an operation-waiting state of low power-consumption cheaply without complicating the structures of the host computer and the display monitor when the manipulations of a manipulation-inputting means such as a keyboard, a mouse and the like of the host computer are not done for the predetermined time period.

According to the thirty-second aspect of the present invention, there is provided a control method of a computer system comprising a generating step generating an indicating signal for switching the CRT of a display monitor to a low power-consuming state thereof when manipulation-inputting to a host computer is not done for a predetermined time, a transmitting step transmitting the indicating signal generated at the generating step from the host computer to the display monitor, and a switching step switching the CRT to the low power-consuming state thereof on the basis of the indicating signal transmitted at the transmitting step.

As stated above, in the control method of the computer system according to the thirty-second aspect of the present invention, the indicating signal for switching the CRT of the display monitor to the low power-consuming state thereof when manipulation-inputting to the host computer is not done for the predetermined time period is generated, and the generated indicating signal is transmitted from the host computer to the display monitor, then the CRT is switched to the low power consuming state thereof on the basis of the transmitted indicating signal. Consequently, the CRT of the display monitor can be shifted to an operation-waiting state of low power-consumption with a simple and cheap structure.

According to the thirty-third aspect of the present invention, there is provided a control method of a computer system where an indicating signal from a host computer for switching the CRT of a display monitor to a low power-consuming state thereof when manipulation-inputting to the host computer is not done for a predetermined time period is constituted of an indicating signal for prohibiting impressing voltages to be supplied to the deflecting and high-voltage-impressing circuit of the CRT.

As stated above, in the control method of the computer system according to the thirty-third aspect of the present invention, impressing the voltages to be supplied to the deflecting and high-voltage-impressing circuit of the CRT of the display monitor is prohibited by the indicating signal from the host computer for switching the CRT to the low power-consuming state thereof when manipulation-inputting to the host computer is not done for the predetermined time period. Consequently, the CRT of the display monitor can be shifted to an operation-waiting state thereof from which the CRT can return to its ordinary operating state at once by the indicating signal from the host computer corresponding to the manipulation of a manipulation-inputting means such as a keyboard, a mouse and the like with a simple and cheap structure.

According to the thirty-fourth aspect of the present invention, there is provided a control method of a computer system where an indicating signal from a host computer for switching the CRT of a display monitor to a low power-consuming state thereof when manipulation-inputting to the host computer is not done for a predetermined time period is constituted of an indicating signal for prohibiting impressing a voltage to be supplied to the heater of the CRT.

As described above, in the control method of the computer system according to the thirty-fourth aspect of the present invention, impressing the voltage to be supplied to the heater of the CRT of the display monitor is prohibited by the indicating signal from the host computer for switching the CRT to the low power-consuming state thereof when manipulation-inputting to the host computer is not done for the predetermined time period. Consequently, the CRT of the display monitor can be shifted to an operation-waiting state in which the CRT does not consume any electric power almost perfectly by the indicating signal from the host computer corresponding to the manipulation of a manipulation-inputting means such as a keyboard, a mouse and the like with a simple and cheap structure.

According to the thirty-fifth aspect of the present invention, there is provided a control method of a computer system whose transmitting step transmitting an indicating signal from a host computer for switching the image-displaying means of a display monitor to a low power-consuming state thereof when manipulation-inputting to the host computer is not done for a predetermined time period from the host computer to the display monitor transmits the indicating signal with an asynchronous type serial communication system.

As described above, in the control method of the computer system according to the thirty-fifth aspect of the present invention, the indicating signal from the host computer for switching the image-all splaying means of the display monitor to the low power-consuming state thereof when manipulation-inputting to the host computer is not done for the predetermined time period is transmitted from the host computer to the display monitor with the asynchronous type serial communication system. Consequently, the transmission of the indicating signal for shifting the display monitor to an operation-waiting state of low power-consumption thereof from the host computer to the display monitor can be executed with a widely usable communication system using fewer communications lines, and the image-displaying means of the display monitor can be shifted to the operation-waiting state of low power-consumption with a simple and cheap structure.

According to the thirty-sixth aspect of the present invention, there is provided a control method of a computer system whose transmitting step transmitting an indicating signal from a host computer for switching the image-displaying means of a display monitor to a low power-consuming state thereof when manipulation-inputting to the host computer is not done for a predetermined time period from the host computer to the display monitor transmits the indicating signal with a synchronous type serial communication system.

As stated above, in the control method of the computer system according to the thirty-sixth aspect of the present invention, the indicating signal from the host computer for switching the image-displaying means of the display monitor to the low power-consuming state thereof when manipulation-inputting to the; host computer is not done for the predetermined time period is transmitted from the host computer to the display monitor with the synchronous type serial communication system. Consequently, the transmission of the indicating signal for shifting the display monitor to an operation-waiting state thereof from the host computer to the display monitor can be realized by a simple controlling logic in a securely controllable communication system, and the image-displaying means of the display monitor can be shifted to the operation-waiting state of low power-consumption thereof with a simple and cheap structure.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail on reference to the accompanying drawings.

EMBODIMENT 1

Figure 1:
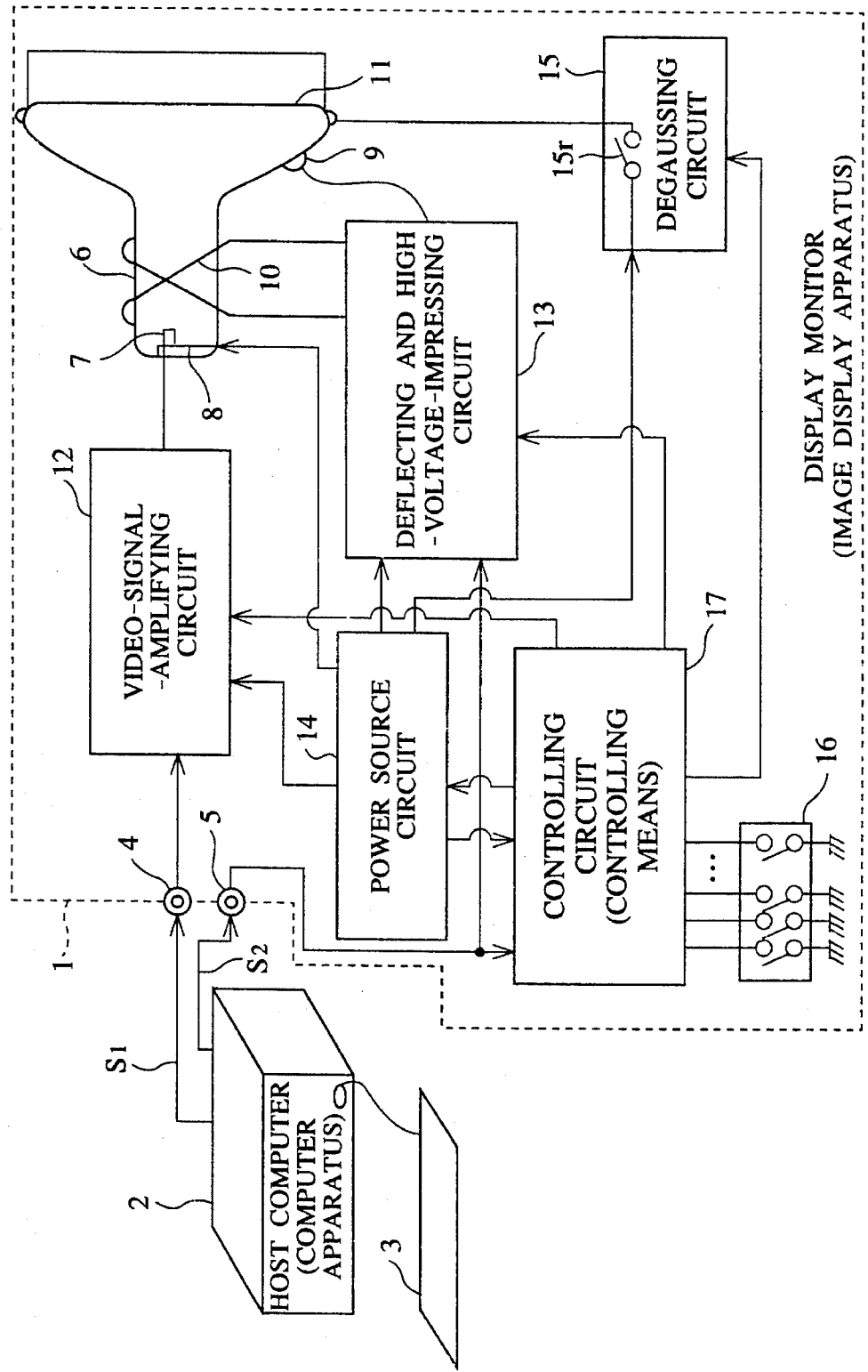
FIG. 1 is a block diagram showing a construction of an example of a prior art computer system.
Figure 2:
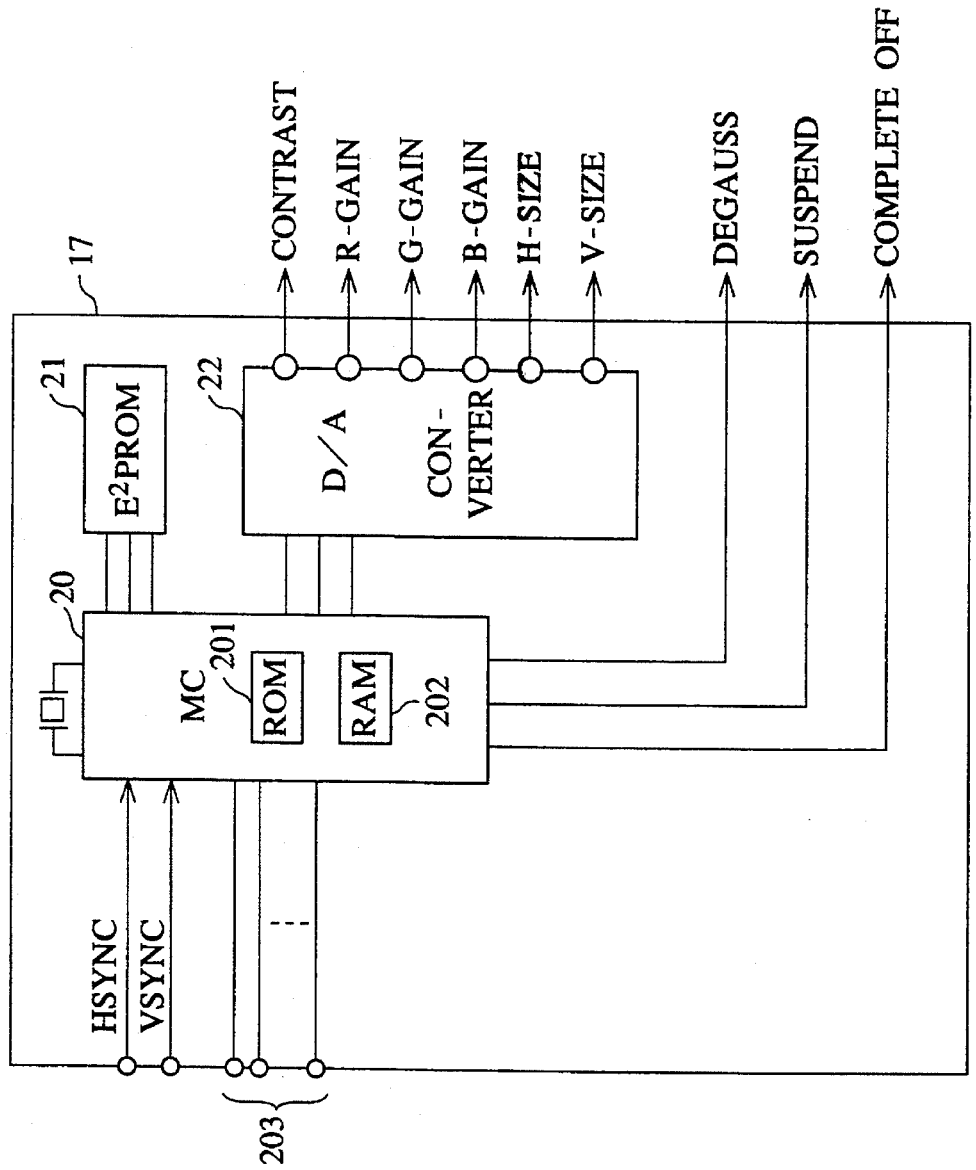
FIG. 2 is a block diagram showing a construction of the controlling circuit of the computer system of FIG. 1.
Figure 5:
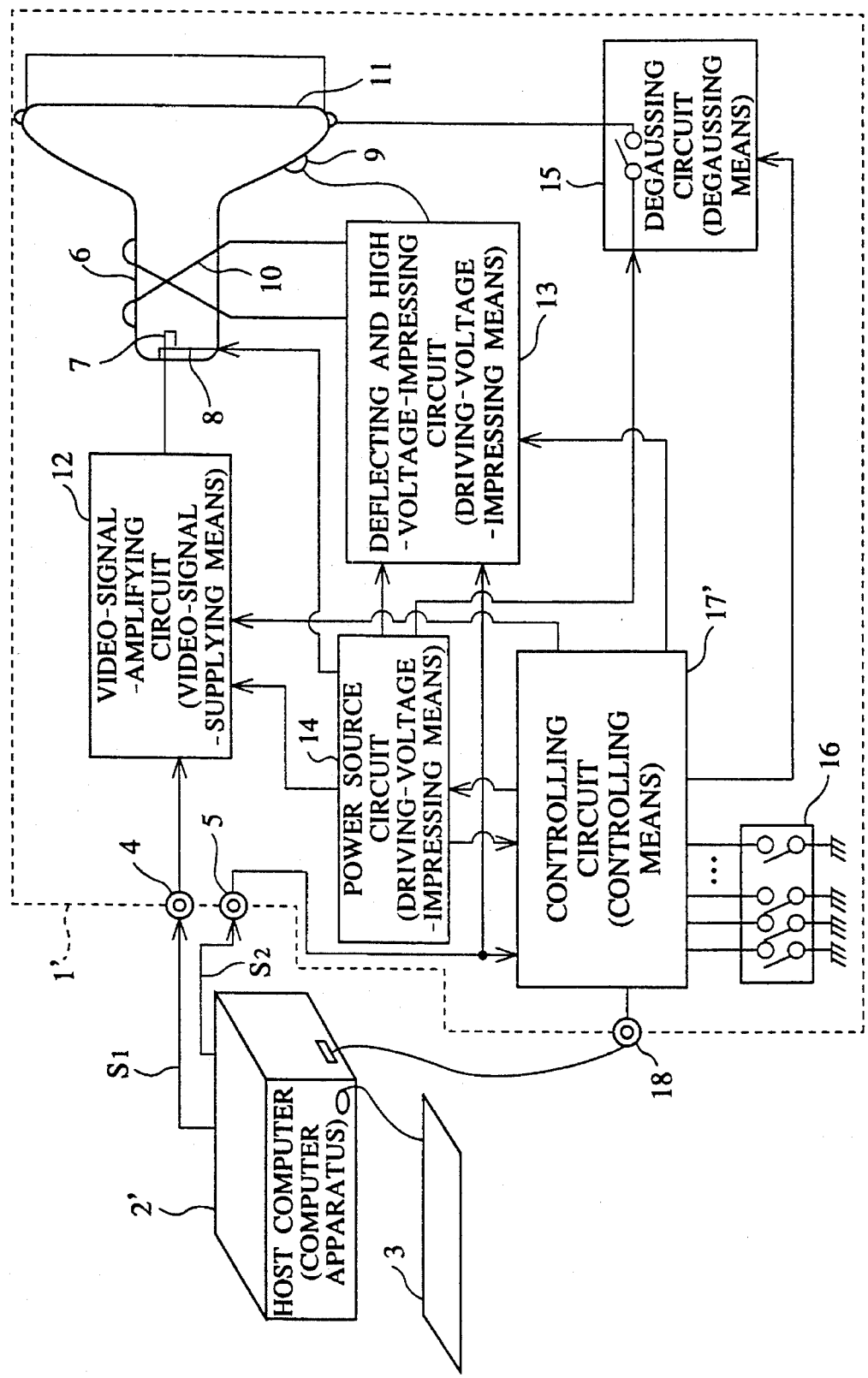
FIG. 5 is a block diagram showing an embodiment of a computer system of the present invention.

FIG. 5 is a block diagram showing a computer system of the first embodiment of the present invention. In FIG. 5, the same construction elements as those of the prior art computer system of FIG. 1 are designated by the same reference numerals as those of the prior art computer system, and the description concerning them will be omitted. The constructions of the controlling circuit 17' of the display monitor 7' and the host computer 2' differs from those of the prior art computer system. The controlling circuit 17' comprises an RS232C interface which is a communicating means communicable with the host computer 2', and reference numeral 18 designates a connecting terminal of the interface of the controlling circuit 17' to the host computer 2'.

Figure 6:
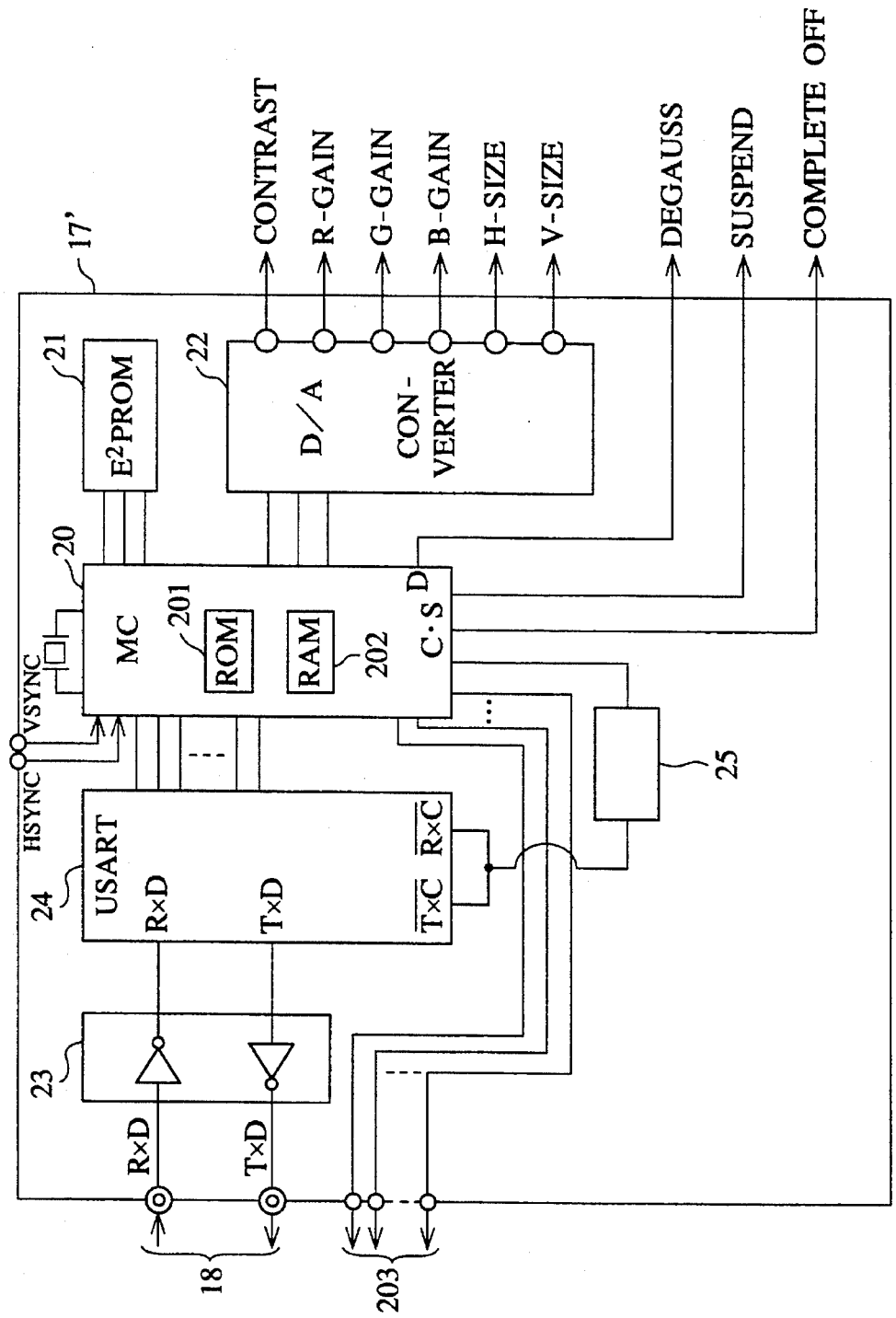
FIG. 6 is a block diagram showing a construction of the controlling circuit of the embodiment of FIG. 5.

FIG. 6 is a block diagram showing the internal construction of the controlling circuit 17'. In FIG. 6, the same construction elements as those of the prior art controlling circuit 17 are designated by the same reference numerals as those of the prior art controlling circuit 17, and the description concerning them will be omitted. Reference numeral 23 designates an RS232C driver/receiver for transforming voltages to the voltages fitted to the RS232C standard, and each one side terminal of it is connected to the RS232C serial port 42 of the host computer 2' through the connecting terminal 18. Reference numeral 24 designates a universal synchronous asynchronous receiver transmitter (hereinafter referred to as "USART" for short) (8251A is used in this embodiment) (synchronous-asynchronous-combined type serial-parallel converter), each one side terminal of which is connected to each other side terminal of the RS232C driver/receiver 23. The controlling terminal and the data bus of the USART 24 are connected to the I/O terminals of the MC 20. Reference numeral 25 designates a baud rate generator for generating operating clock signals of the USART 24, the inputting terminal of which is connected to the clock terminal of the MC 20, the outputting terminal of which is connected to the Txc terminal and the Rxc terminal of the USART 24.

Figure 3:
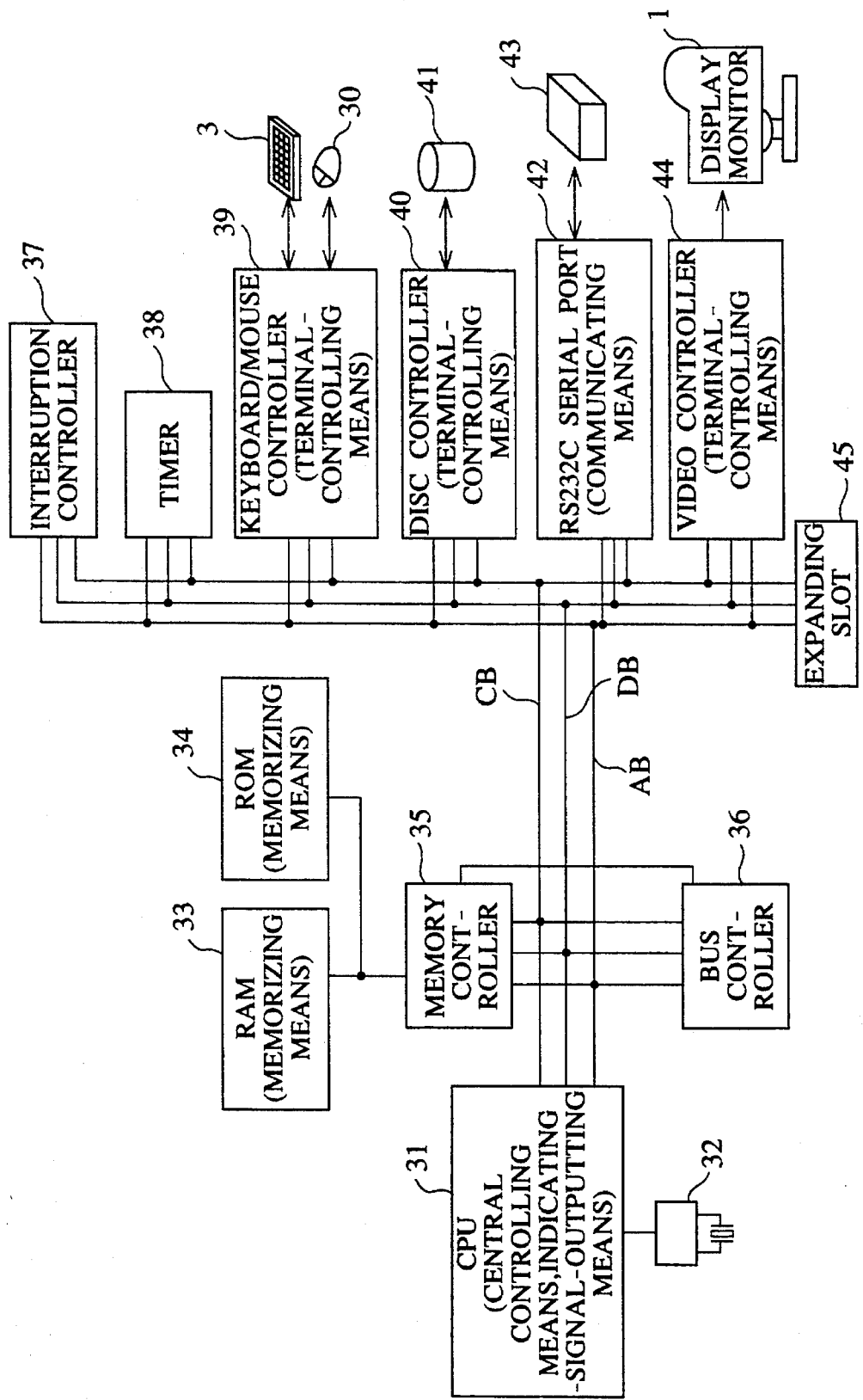
FIG. 3 is a block diagram showing a construction of the host computer of the computer system of FIG. 1.
Figure 4:
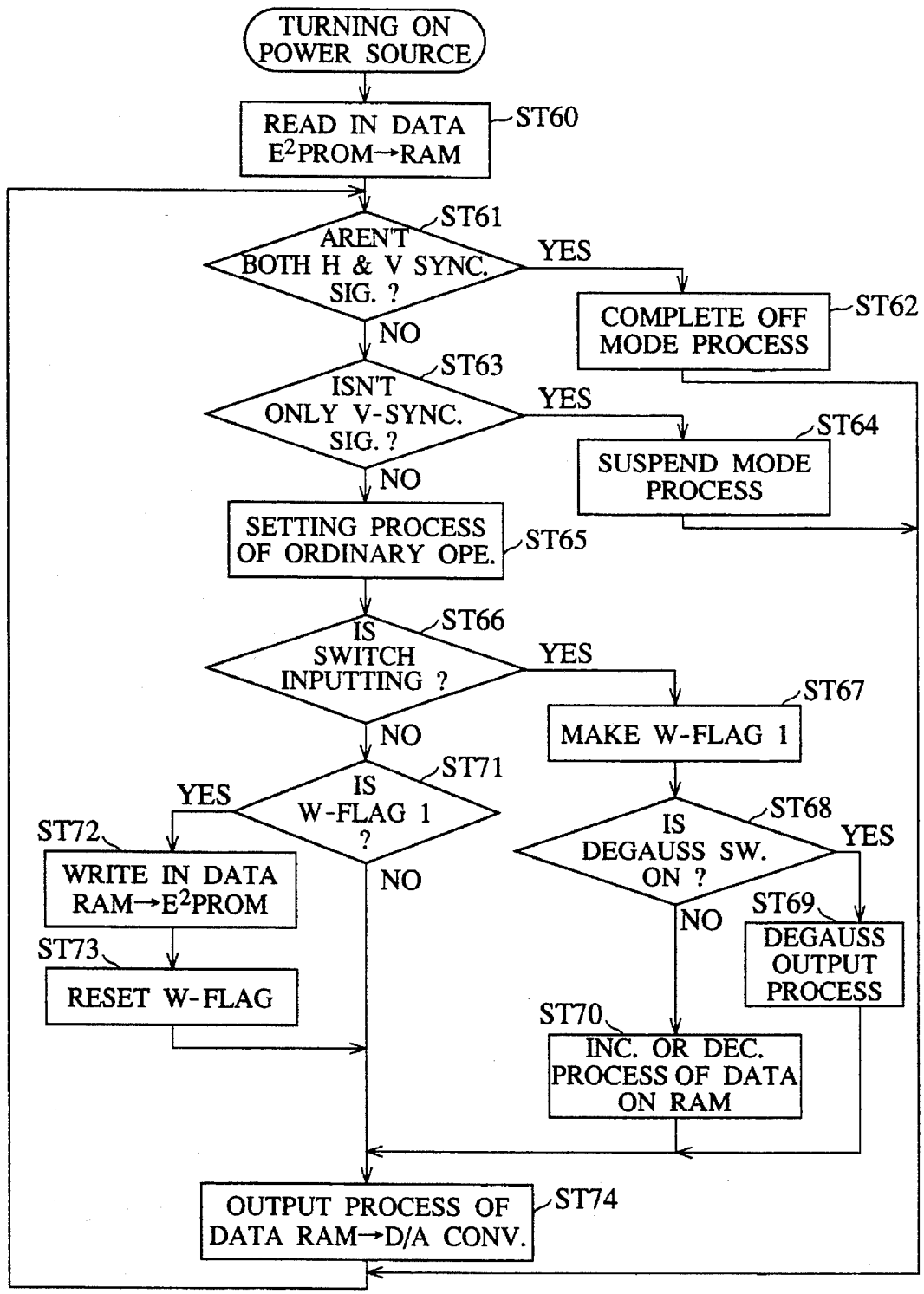
FIG. 4 is a flow chart showing the operation of the computer system of FIG. 1.

Since the construction of the host computer 2' of this embodiment is identical to that of the prior art host computer 2 of FIG. 3, the description thereof will be omitted. Provided that controlling programs required to embody the present invention are memorized in the hard disc 41, and the controlling programs are read into the RAM 33 through the disc controller 40 and the data bus DB and are executed by the CPU 31. Besides, the RS232C driver/receiver 23 of the controlling circuit 17' is connected to the RS232C serial port 42 through the connecting terminal 18 mentioned above, and then the communication with the host computer 2' is made possible by that connection.

Figure 7:
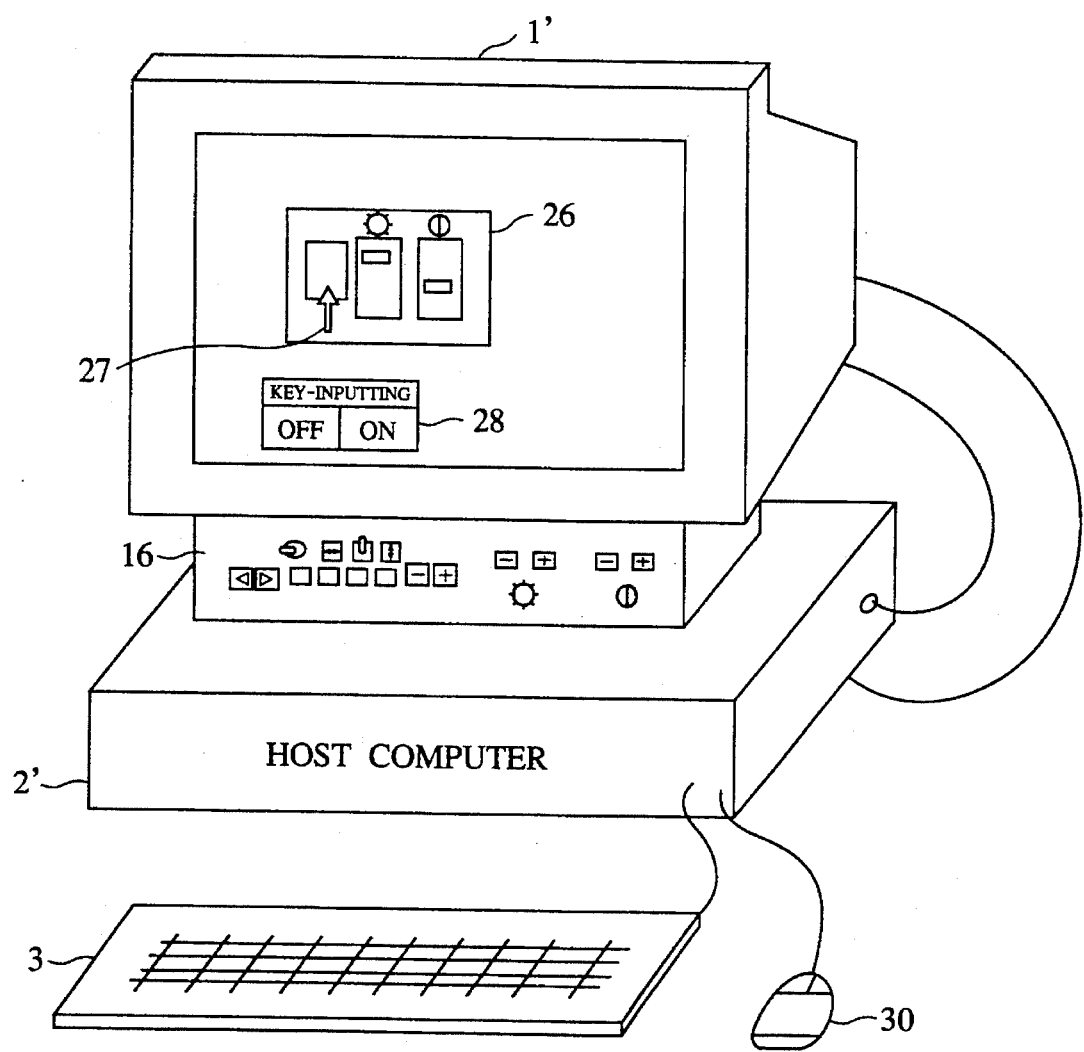
FIG. 7 is a perspective view showing an external appearance of the embodiment of FIG. 5.

FIG. 7 is a perspective view showing the external appearance of this embodiment. In FIG. 7, reference numeral 26 designates selection images indicating choices such as the degaussing of the CRT 6 and the adjustment of the brightness or the contrast etc. of the displayed images. The controlling commands commanding functions corresponding to the choices are transmitted to the display monitor 1' by selecting the choices by moving the cursor 27 with the keyboard 3 or the mouse 30. Reference numeral 28 designates a switch for switching the selection operation of the choices.

Figure 8:
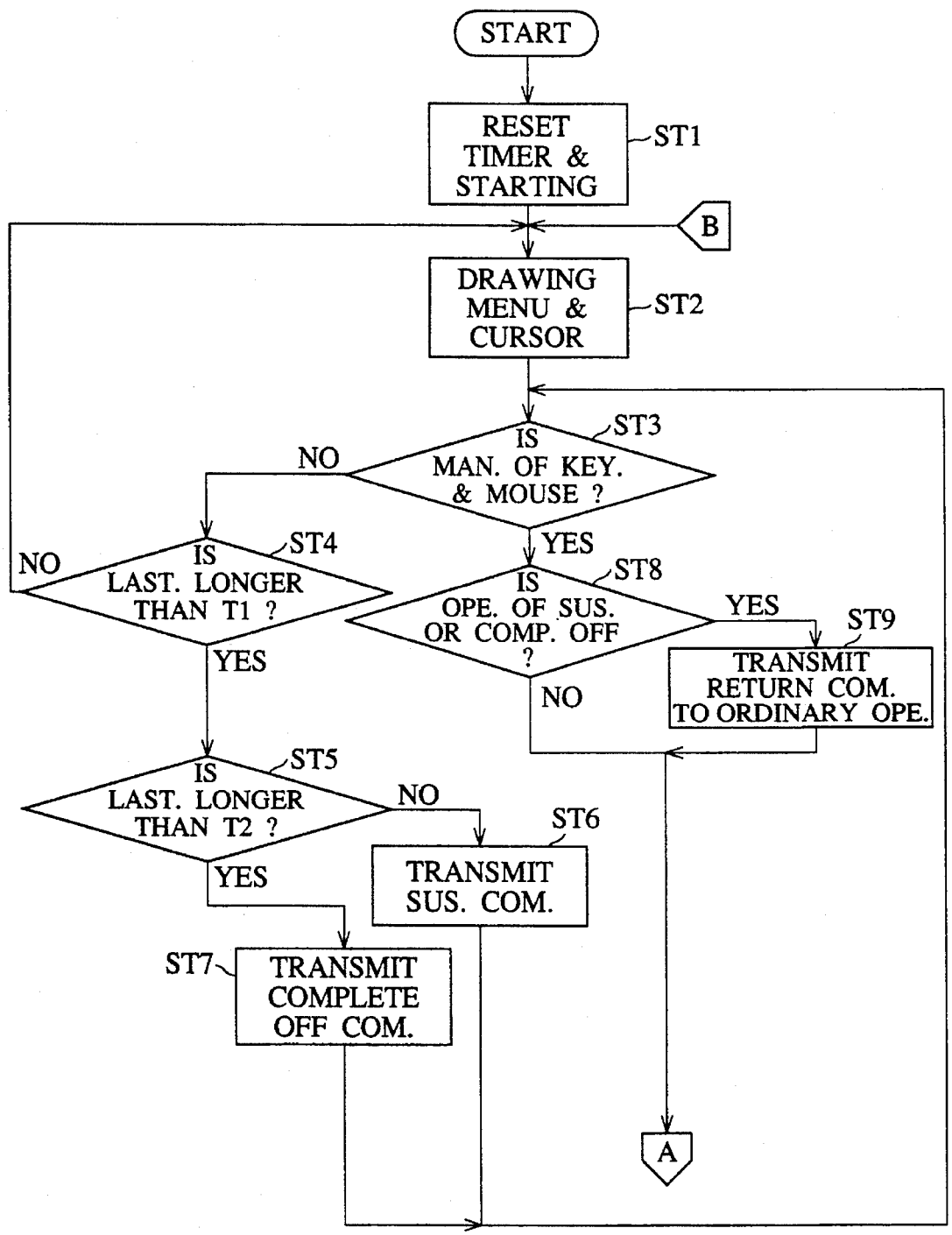
FIG. 8 is a part of a flow chart showing a part of the operation of the host computer of the embodiment of FIG. 5.
Figure 9:
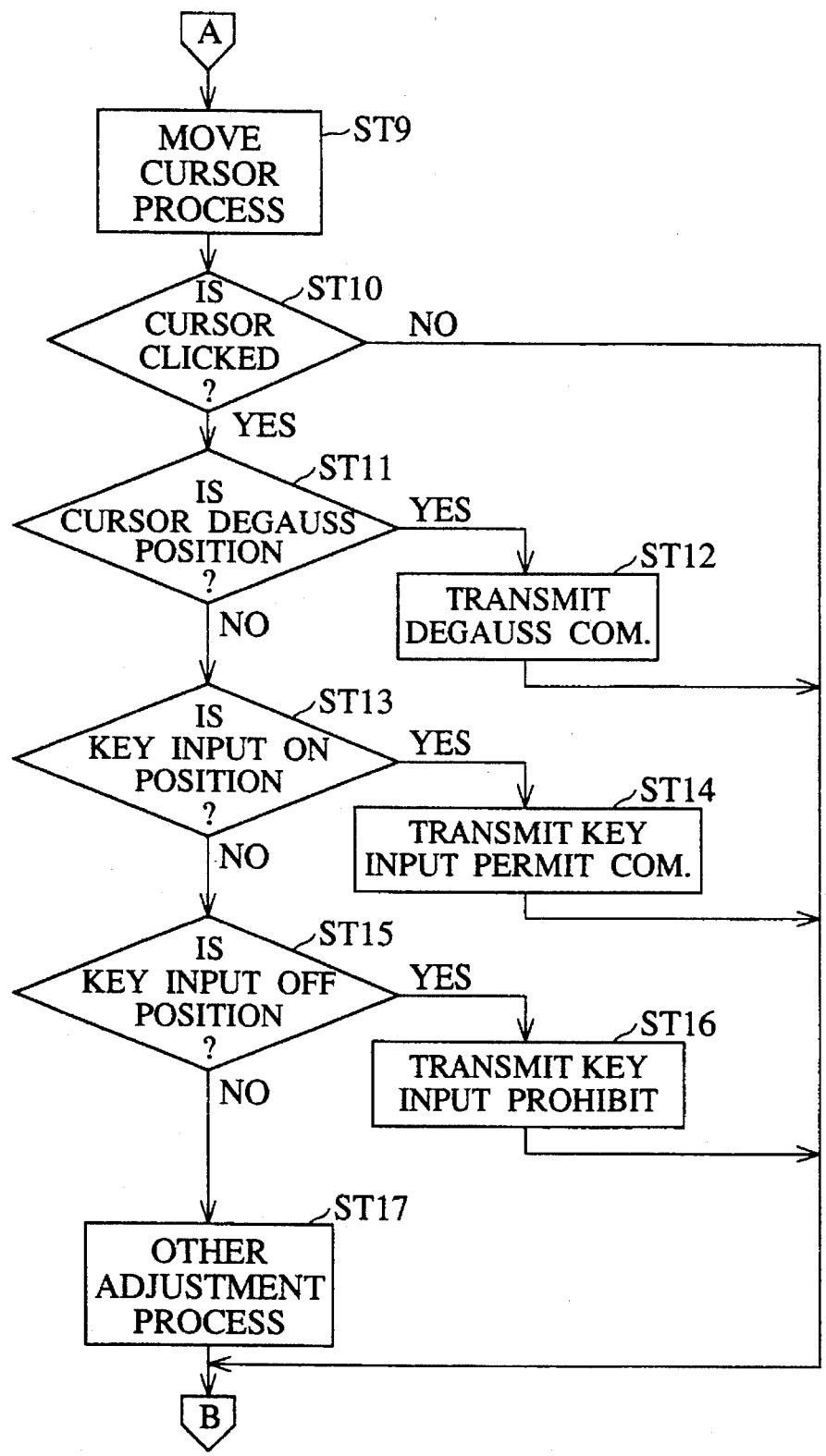
FIG. 9 is a part of a flow chart showing a part of the operation of the host computer of the embodiment of FIG. 5.
Figure 10:
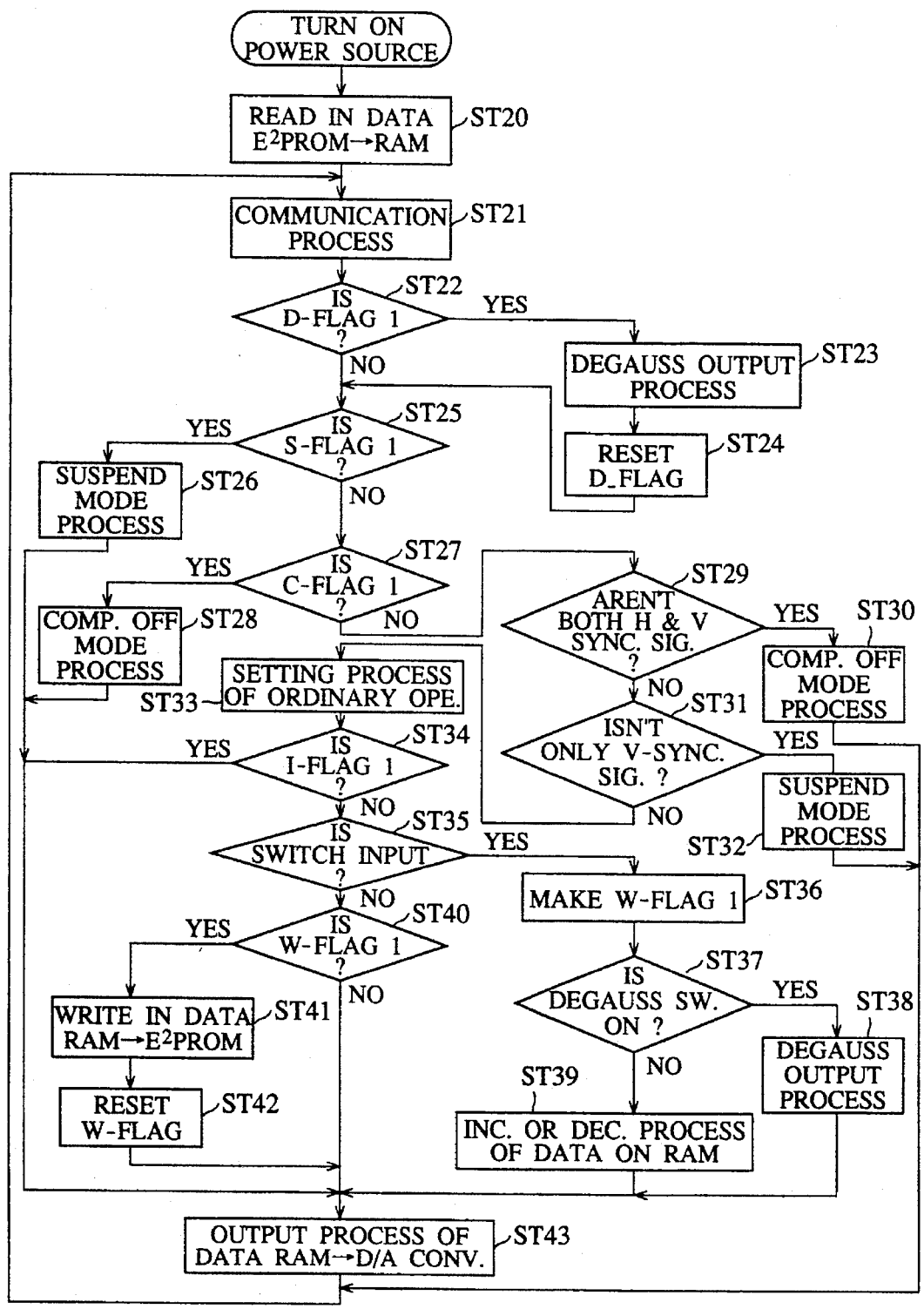
FIG. 10 is a part of a flow chart showing a part of the operation of the display monitor of the embodiment of FIG. 5.
Figure 11:
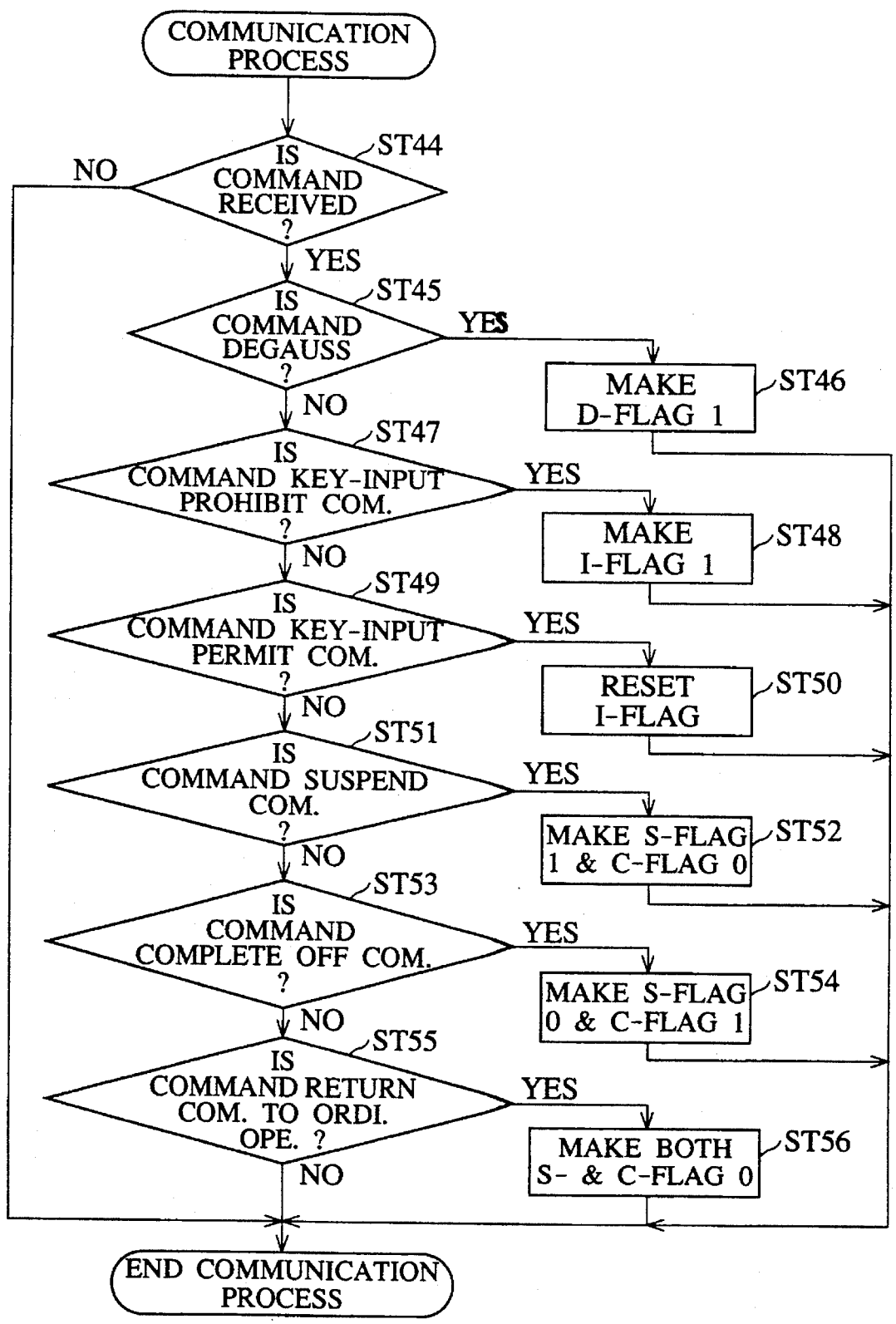
FIG. 11 is a flow chart showing the communication process part of the flow chart of FIG. 10.

FIG. 8 and FIG. 9 are flow charts showing a part of the controlling programs, memorized in the hard disc 41 of the host computer 2', for this embodiment; FIG. 10 is a flow chart showing a part of the operation-controlling programs, memorized in the ROM of the MC 20 of the display monitor 1' of this embodiment; and FIG. 11 is a flow chart showing the contents of the STEP ST21 of the flow chart of FIG. 10.

Next, the operation of this embodiment will be described. At first, the operation of the host computer 2' will be described on the basis of the flow charts of FIG. 8 and FIG. 9.

When the power source is turned on, the host computer 2' resets all parts containing the timer 38 as initialization, and it starts all parts (STEP ST1). Next, the selection images 26 and the cursor 27 are displayed on the displaying faceplate of the CRT 6 when the displaying of the selection images 26 is indicated by the manipulation of the keyboard 3 (STEP ST2). The host computer 2' judges in this state whether the inputting manipulations of the keyboards 3 or the mouse 30 were done or not (STEP ST3). When the inputting manipulations of both of them were not done, the host computer 2' judges by referring to time periods timed by the timer 38 whether the time period during which the inputting manipulations are not done is continuing for a time period equal to or longer than the predetermined time period T1 or not (STEP ST4). In the case where the time period during which the inputting manipulations are not done is shorter than the predetermined time period T1, the host computer 2' returns to the STEP ST2 and displays the selection images 26 and the cursor 27 on the displaying faceplate of the CRT 6 again. In the case where the time period during which the inputting manipulations are not done is continuing for a time period equal to or longer than the predetermined time period T1, the host computer 2' judges whether the time period during which the inputting manipulations are not done is continuing for a time period equal to or longer than the predetermined time period T2 being longer than the predetermined time period T1 or not (STEP ST5). In the case where the time period during which the inputting manipulations are not done is shorter than the predetermined time period T2 (that is, in the case where it is longer than the time period T1 and shorter than the time period T2), the host computer 2' transmits the SUSPEND command from the RS232C serial port 42 to the controlling circuit 17' of the display monitor 1' (STEP ST6). Moreover, in the case where the inputting manipulations were not done for a time period longer than the time period T2, the host computer 2' transmits the COMPLETE OFF command to the controlling circuit 17' (STEP ST7). After transmitting the SUSPEND command or the COMPLETE OFF command, the host computer 2' returns to the STEP ST3 and judges whether the manipulation-inputting of the keyboard 3 or the mouse 30 was done or not.

In the case where the manipulation-inputting of the keyboard 3 or the mouse 30 was done, the host computer 2' judges whether the display monitor 1' is operating the processes of the SUSPEND mode or the COMPLETE OFF mode or not (STEP ST8). In the case where the display monitor 1' is operating the processes of the SUSPEND mode or the COMPLETE OFF mode, the host computer 2' transmits a restoring command for restoring the display monitor 1' to the ordinary operation thereof (STEP ST9). After transmitting the restoring command, the host computer 2' moves to the next selecting routine of the selection images 26. Moreover, in the case where the display monitor 1' is not operating the processes of the SUSPEND mode or the COMPLETE OFF mode, the host computer 2' moves to the next selecting routine of the selection images 26 at once.

In the next selecting routine of the selection images 26, the host computer 2' moves the cursor 27 according to the operator's manipulation-inputting of the mouse 30 (STEP ST9). The host computer 2' continues this moving process of the cursor 27 till the cursor 27 is clicked (STEP ST10). When the cursor 27 is clicked, the host computer 2' judges at which place of the selection images 26 the cursor 27 was clicked. At first, the host computer 2' judges whether the cursor 27 is at the position of the DEGAUSS process or not (STEP ST11), then the host computer 2' transmits the DEGAUSS command to the display monitor 1' in the case where the cursor 27 is at the position of the DEGAUSS process (STEP ST12). In the case where the cursor 27 is not at the position of the DEGAUSS process, next, the host computer judges whether the cursor 27 is at the position of the selection image of key-inputting "ON" for permitting the MC 20 of the display monitor 1' to take in the manipulation-inputting data from the switch group 16 or not (STEP ST13). In the case where the cursor 27 is at the position of the key-inputting "ON", the host computer 2' transmits the key-inputting permitting command to the display monitor 1' (STEP ST14). In the case where the cursor 27 is not at the position of the key-inputting "ON", the host computer judges whether the cursor 27 is at the position of the selection image of key-inputting "OFF" position for prohibiting the MC 20 to take in the manipulation-inputting data from the switch group 16 or not (STEP ST15). In the case where the cursor 27 is at the "OFF" position, the host computer transmits the key-inputting prohibiting command to the display monitor 1' (STEP ST16). In the case where the cursor 27 is not at the "OFF" position, too, the host computer 2' executes the adjusting processes indicated by other selection images at which the cursor 27 is detected (STEP ST17). After finishing these series of selecting routine of the selection images 26, the host computer 2' returns to the STEP ST2 again, and it executes the drawing process of the selection images 26 and the cursor 27 (STEP ST2).

Next, the operation of the display monitor 1' side will be described on the basis of the flow charts of FIG. 10 and FIG. 11. At first, when the power source is thrown in, the controlling circuit 17' of the display monitor 1' reads out the data written in the E$^2$PROM 21 to the RAM 202 (STEP ST20). Next, the display monitor 1' executes the communication process with the host computer 2' (STEP ST21), and it executes setting the D-flag and setting or resetting the I-flag, the S-flag and the C-flag in obedience to the commands transmitted from the host computer 2'. Now, the D-flag is the execution flag of the DEGAUSS process, and the I-flag and the S-flag are the execution flag of the SUSPEND mode process, further the C-flag is the execution flag of the COMPLETE OFF mode process.

Now, the communication process routine will be described on reference to the flow chart of FIG. 11. Entering into the communication process routine, at first the MC 20 judges whether it has received some commands from the host computer 2' or not (STEP ST44). In the case where it has not received any command, it finishes the communication process routine and moves to the next STEP ST22. In the case where the MC 20 has received some command, the MC 20 judges the kind of the command. At first, the MC 20 judges whether the received command is the DEGAUSS process command or not (STEP ST45). In the case where the command is the DEGAUSS process command, the MC 20 makes the D-flag "1" (STEP ST46) and finishes the communication process routine. In the case where the received command is not the DEGAUSS process command, the MC 20 judges whether the command is the key-inputting prohibiting command or not next (STEP ST47). In the case where the command is the key-inputting prohibiting command, the MC 20 makes I-flag (STEP ST48) and finishes the communication process routine. In the case where the received command is not the key-inputting prohibiting command, the MC 20 judges whether the command is the key-inputting permitting command or not next (STEP ST49). In the case where the command is the key-inputting permitting command, the MC 20 makes the I-flag "0" by resetting it (STEP ST50) and finishes the communication process routine. In the case where the command is not the key-inputting command, the MC 20 judges whether the received command is the SUSPEND mode process command or not next (STEP ST51). In the case where the command is the SUSPEND mode process command, the MC 20 makes the S-flag "1" and makes the C-flag "0" (STEP ST52), and it finishes the communication process routine. In the case where the command is not the SUSPEND mode process command, the MC 20 judges whether the received command is the COMPLETE OFF mode process command or not (STEP ST53). In the case where the command is the COMPLETE OFF mode process command, the MC 20 makes the S-flag "0" and makes the C-flag "1" (STEP ST54), and it finishes the communication process routine. In the case where the received command is not the COMPLETE OFF mode process command, the MC 20 judges whether it is the restoring command to the ordinary operation or not (STEP ST55). In the case where the command is the restoring command to the ordinary operation, the MC 20 makes both the S-flag and the C-flag "0" (STEP ST56). In the case where the command is not the restoring command to the ordinary operation, the MC 20 does not execute any processing and finishes the communication process routine. In the communication process routine described above, all of the flags are memorized in the RAM 202 of the MC 20.

Finishing the communication process routine, the MC 20 executes the process operation corresponding to each kind of flag set in the communication process routine. For the sake of it, the MC 20 judges whether the D-flag is "1" or not at first (STEP ST22). In the case where the D-flag is "1", the MC 20 makes the DEGAUSS signal output in the "H" level for a predetermined time period to degauss the CRT 6 (STEP ST23). Finishing this degauss process, the MC 20 resets the D-flag (STEP ST24) and moves to the STEP ST25. In the case where the D-flag is not "1", the MC 20 does not execute the DEGAUSS process and moves to the STEP ST25 at once.

In the STEP ST25, the MC 20 judges whether the S-flag is "1" or not. In the case where the S-flag is "1", the MC 20 executes the SUSPEND mode process, and it makes the SUSPEND signal output in the "H" level and makes the COMPLETE OFF signal output in the "L" level. Then the MC 20 stops the voltage-outputting of the deflecting-and-high-voltage-impressing circuit 13 (STEP ST26). After it, the MC 20 moves to the STEP ST24. In the case where the S-flag is not "1", the MC 20 judges whether the C-flag is "1" or not next (STEP ST27). In the case where the C-flag is "1", the MC 20 makes both the SUSPEND signal output and the COMPLETE OFF signal output outputted from the MC 20 in the "H" level. And the MC 20 stops the operation of the CRT 6 completely by stopping both the supplement of the power source voltages to the deflecting-axed-high-voltage-impressing circuit 13 from the power source circuit 14 and the supplement of the heating electric power to the heater electrode 8 of the CRT 6 from the power source circuit 14 (STEP ST28). After this process, the MC 20 moves to the STEP ST43.

In the case where the C-flag is not "1", the MC 20 judges the existence of the H-synchronizing signal and the V-synchronizing signal (STEP ST29). This step is for making the most of the synchronizing-signal-stopping function of the host computer which does not have the outputting function of the SUSPEND mode command and the COMPLETE OFF mode command of the present invention and has only the stopping function of the H-synchronizing signal and the V-synchronizing signal in case of using the display monitor 1' combined with the above mentioned host computer only having the stopping function of the synchronizing signals. Accordingly, the MC 20 judges at first whether the case is that both the H-synchronizing signal and the V-synchronizing signal do not exist or not, similarly to the prior art display monitor 1 (STEP ST29). In the case where both the synchronizing signals do not exist, the MC 20 executes the COMPLETE OFF mode process mentioned above (STEP ST30). In the case where either of the H-synchronizing signal and the V-synchronizing signal exists, the MC 20 judges whether the case is that only the V-synchronizing signal does not exist or not (STEP ST31). In the case where only the V-synchronizing signal does not exist, the MC 20 executes the SUSPEND mode process (STEP ST32). After finishing the COMPLETE OFF mode or the SUSPEND mode process, the MC 20 returns to the STEP ST21 and executes a new communication-process.

In the case where only the H-synchronizing signal or both the H-synchronizing signal and V-synchronizing signal exist, the MC 20 makes both the SUSPEND signal output and the COMPLETE OFF signal output in the "L" level to set the CRT to the ordinary operation mode thereof by making power source circuit 14 operate normally (STEP ST33). Next, the MC 20 judges whether the I-flag is "1" or not (STEP ST34). In the case where the I-flag is "1", the MC 20 moves to the STEP ST43 without executing the following steps to the STEP ST35, since taking manipulation-inputted data from the switch group 16 in is prohibited. In the case where the I-flag is not "1", the MC 20 judges the existence of the manipulation-inputted data from the switch group 16 (STEP ST35). Even if one datum of manipulation-inputting of any switch exists, the MC 20 makes the W-flag "1" at first similarly to the prior art (STEP ST36), then it judges whether the manipulation datum of the DEGAUSS switch exists or not (STEP ST37). In the case where the DEGAUSS signal has been inputted, the MC 20 executes the DEGAUSS process (STEP ST38) to degauss the CRT 6, and it moves to STEP ST43. In the case where the DEGAUSS signal has not been inputted, the MC 20 executes the increasing or the decreasing process of the data in the RAM 202 of the MC 20 in obedience to the manipulation-inputting data from the switch group 16 such as brightness, chromaticity and the like (STEP ST39), and it moves to the STEP ST43.

In the case where there is no manipulation-inputting from any switch of the switch group 16 in STEP ST35, the MC 20 judges the value of the W-flag (STEP ST40). In the case where the W-flag is "0", the MC 20 moves to the STEP 43 as it is, since there has been no setting of new operation conditions of the CRT 6. In the case where the W-flag is "1", since a new setting of the operation condition of the CRT has been done, the MC 20 writes the condition into the $E^2PROM$ 21 from the RAM 202 in order to preserve the condition (STEP ST41). And the MC 20 resets the W-flag (STEP ST42), then it moves to the STEP ST43. In the STEP ST43, the MC 20 outputs the data on the RAM 202 to the D/A converter 22 to transform controlling data of every kind into analogue signals, and the D/A converter 22 outputs the analogue signals to the image-signal-amplifying circuit 12. Then the image-signal-amplifying circuit 12 controls the display on the CRT 6 on the basis of the controlling data.

EMBODIMENT 2

Figure 12:
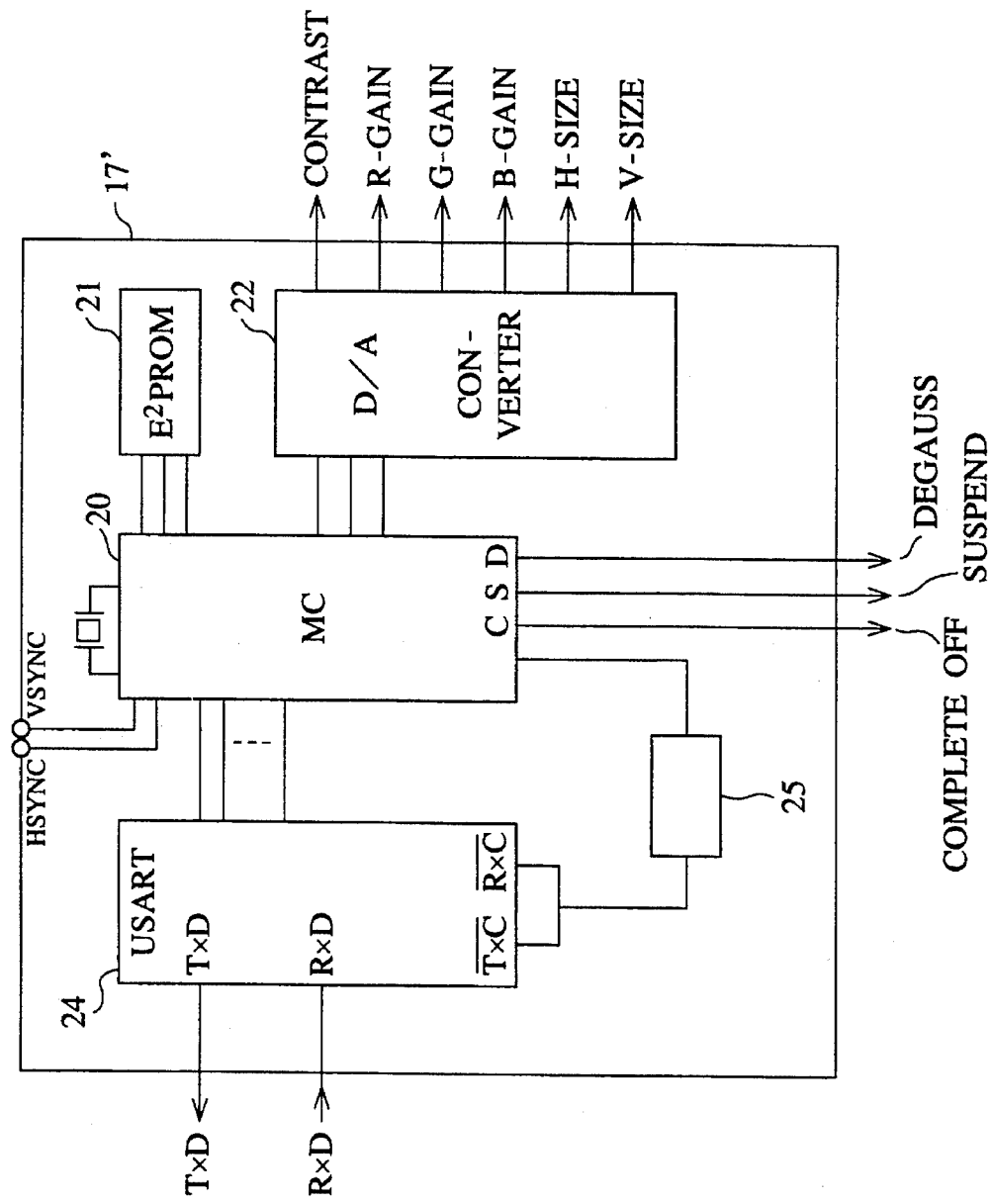
FIG. 12 is a block diagram showing a construction of the controlling circuit of a second embodiment of the present invention.

FIG. 12 is a block diagram showing the construction of the second embodiment of the controlling circuit 17' of the display monitor 1' of the present invention. In this embodiment, the RS232C driver/receiver 23 of the first embodiment is omitted. Then it does not conform to the RS232C standard, but it can realize the controlling circuit 17' in a simple structure. Since the other structures of it are identical to those of the first embodiment, the description thereof will be omitted.

EMBODIMENT 3

Figure 13:
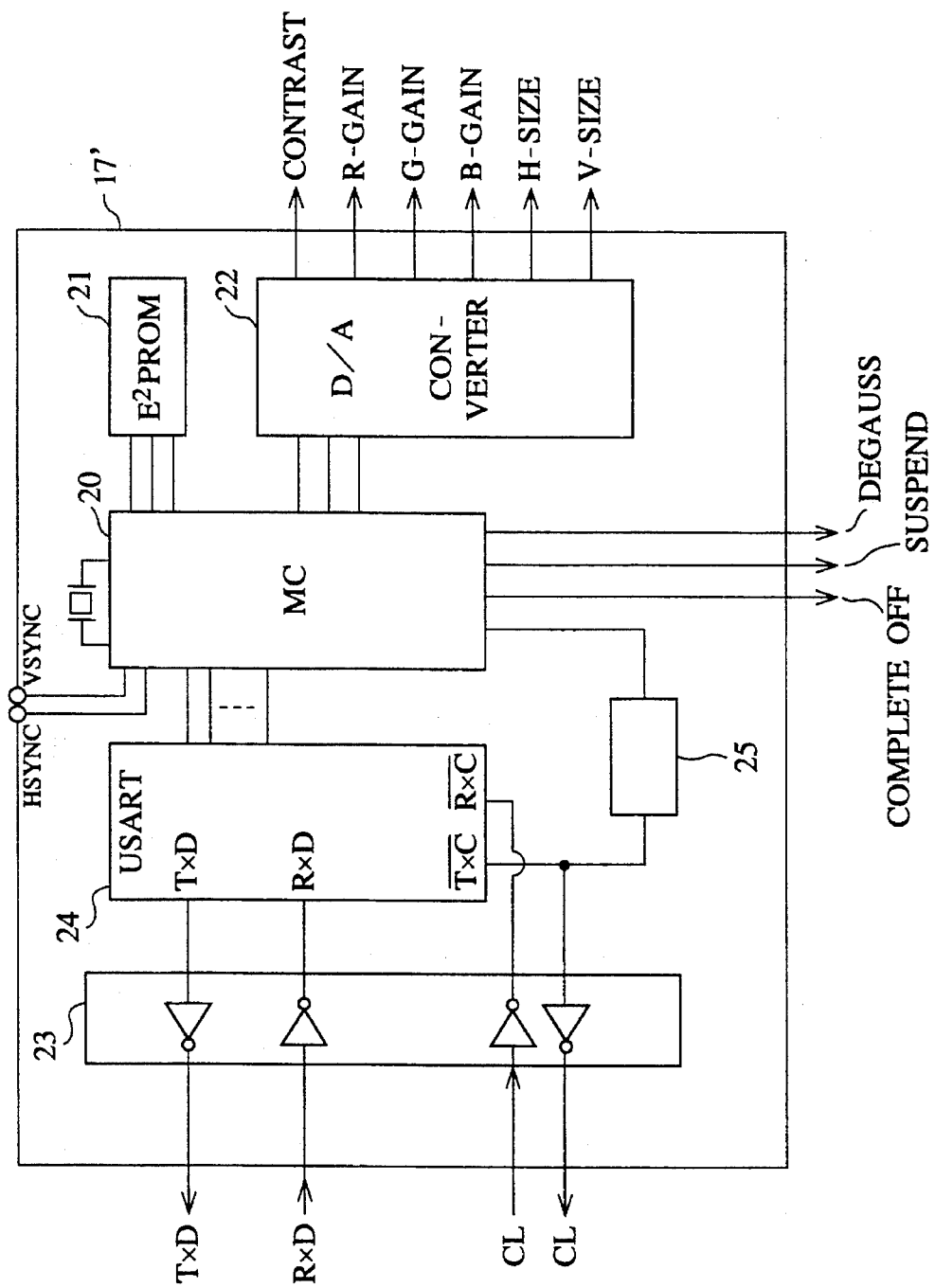
FIG. 13 is a block diagram showing a construction of the controlling circuit of a third embodiment of the present invention.

FIG. 13 is a block diagram showing the construction of the third embodiment of the controlling circuit 17' of the display monitor 1' of the present invention. In this embodiment, the RS232C driver/receiver 23 operates in a clock-synchronizing system. In FIG. 13, reference sign CL designates clock signals for synchronizing. Since the other structures of it are identical to those of the first embodiment, the description thereof will be omitted. In case of the first embodiment, the communication lines for the clock signals CL are unnecessary, then the first embodiment can be widely used. However, in this embodiment, the controlling of the USART 24 becomes easy, and the effect of sure controlling can be obtained.

EMBODIMENT 4

Figure 14:
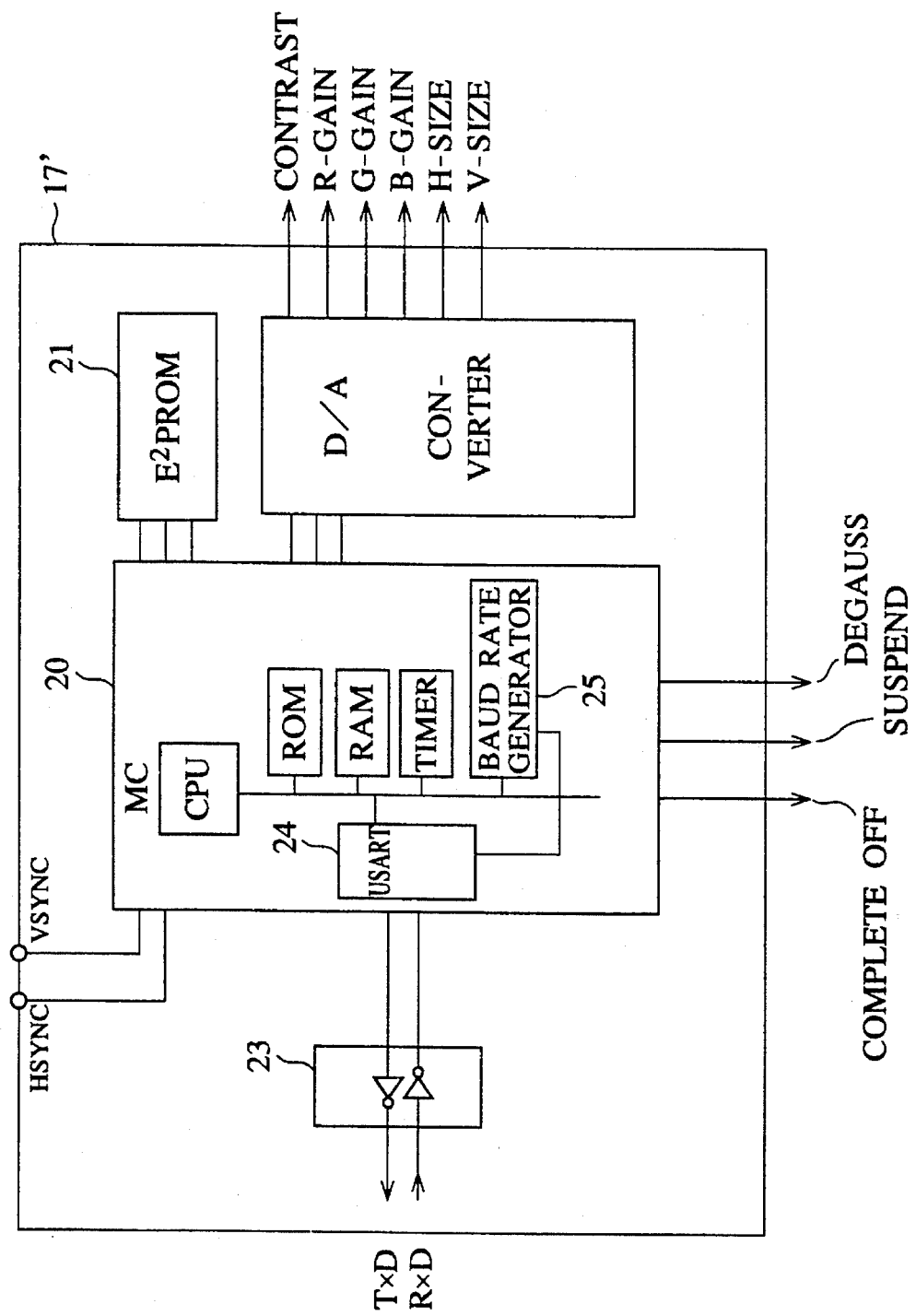
FIG. 14 is a block diagram showing a construction of the controlling circuit of a fourth embodiment of the present invention.

FIG. 14 is a block diagram showing the construction of the fourth embodiment of the controlling circuit 17' of the display monitor 1' of the present invention. In this embodiment, the number of parts is retrenched by using the MC 20 having the USART 24 and the baud rate generator 25 built-in. The USART 24 can be driven in both the synchronous system and the asynchronous system in this embodiment, too. Since the other structures of it are identical to those of the first embodiment, the description thereof will be omitted. In this embodiment, effects such as easiness in constructing, cheapness in cost and the like are obtained, since the number of parts thereof is small.

Moreover, the CRT is used in every embodiment above as the image-displaying means, however image-displaying means other than the CRT such as a liquid crystal display device, electrochromic display device, semiconductor array display device and the like also can be used in the present invention except in the aspect thereof connected with degaussing.

It will be appreciated from the foregoing description that, according to the first aspect of the present invention, since a display monitor is composed so as to degauss the CRT thereof on the basis of a transmitted signal transmitted from a host computer, such an effect can be obtained as the degaussing of the CRT can be done at the hands of an operator by manipulating a manipulation-inputting means such as a keyboard, a mouse and the like which is connected to the host computer.

Furthermore, according to the second aspect of the present invention, since a display monitor is composed so as to use a transmitted signal from a host computer received by a communicating means with the host computer as a degaussing-indicating signal, such an effect can be obtained as the CRT of the display monitor can be degaussed at the hands of an operator by the indicating signal from the host computer corresponding to the manipulation of a manipulation-inputting means such as a keyboard, a mouse and the like.

Furthermore, according to the third aspect of the present invention, since a display monitor is composed so as to receive the transmitted signal from a host computer with a communicating means thereof and to nullify manipulations of an adjusting means for adjusting the displaying state of the displaying faceplate of an image-displaying means on the basis of the received transmitted signal, such effects can be obtained as the adjusting manipulations of the display monitor made by mistake or adjusted into an inappropriate state can be nullified by the manipulations of a manipulation-inputting means such as a keyboard, a mouse and the like which is connected to the host computer, so the misadjustments of an operator can be easily prevented or modified.

Furthermore, according to the fourth aspect of the present invention, since a display monitor is composed so as to receive a manipulation-input-prohibition-indicating signal. Nullifying manipulations of an adjusting means for adjusting the displaying state of an image-displaying means from a host computer and to nullify the manipulations of the adjusting means, such an effect can be obtained as operator's misadjustments of the displaying state of the image-displaying means can be easily prevented or modified by the indicating signal from the host computer corresponding to the manipulation of a manipulation-inputting means such as a keyboard, a mouse and the like.

Furthermore, according to the fifth aspect of the present invention, since a display monitor is composed so as to receive a transmitted signal from a host computer with a communicating means thereof and to switch the image-displaying means thereof to a state of low power-consumption on the basis of the received transmitted signal, such an effect can be obtained as the image-displaying means can be shifted to an operation-waiting state of low power-consumption cheaply without complicating structures of the host computer and the display monitor itself.

Furthermore, according to the sixth aspect of the present invention, since a display monitor is composed so as to receive a transmitted signal from a host computer with a communicating means thereof and to change the CRT thereof to a state of low power-consumption, such an effect can be obtained as the CRT can be shifted to an operation-waiting state of low power-consumption cheaply without complicating structures of the host computer and the display monitor itself.

Furthermore, according to the seventh aspect of the present invention, since a display monitor is composed so as to receive a transmitted signal from a host computer with a communicating means thereof and to prohibit outputting voltages to be supplied to the deflecting and high-voltage impressing circuit of the CRT thereof on the basis of the received transmitted signal, such an effect can be obtained as the CRT can be shifted to an operation-waiting state of low power-consumption from which the CRT can return to its ordinary operating state at once by an indicating signal from the host computer corresponding to the manipulation of a manipulation-inputting means such as a keyboard, a mouse and the like.

Furthermore, according to the eighth aspect of the present invention, since a display monitor is composed so as to receive a transmitted signal from a host computer with a communicating means thereof and to prohibit outputting a voltage to be supplied to the heater of the CRT thereof on the basis of the received transmitted signal, such an effect can be obtained as the CRT can be shifted to an operation-waiting state of low power-consumption in which the CRT does not consume any electric power almost perfectly by an indicating signal from the host computer corresponding to the manipulation of a manipulation-inputting means such as a keyboard, a mouse and the like.

Furthermore, according to the ninth aspect of the present invention, since a display monitor is composed so as to switch its image-displaying means to a low power-consuming state thereof by communicating with a host computer by means of an asynchronous type serial-parallel converter, such effects can be obtained as the communication with the host computer using a widely usable communication system using fewer communications lines can be executed and the image-displaying means can be shifted to an operation-waiting state of low power-consumption by the use of a simple and cheap structure of the display monitor.

Furthermore, according to the tenth aspect of the present invention, since a display monitor is composed so as to switch its image-displaying means to a low power-consuming state thereof by communicating with a host computer by means of a synchronous type serial-parallel converter, such effects can be obtained as the communication with the host computer using a widely usable communication system using fewer communications lines can be executed and the image-displaying means can be shifted to an operation-waiting state of low power-consumption by the use of a simple and cheap structure of the display monitor.

Furthermore, according to the eleventh aspect of the present invention, since a display monitor is composed so as to switch its image-displaying means to a low power-consuming state thereof by communicating with a host computer by means of a synchronous-and-nonsynchronous-combined type serial-parallel converter, such effects can be obtained as the communication, of an indicating signal to shift the display monitor to an operation-waiting state thereof from the host computer to the display monitor by the use of a communication system widely applicable to the transmission system of the host computer side and the image-displaying means can be shifted to an operation-waiting state of low power-consumption by the use of a simple and cheap structure of the display monitor.

Furthermore, according to the twelfth aspect of the present invention, since a host computer is composed so as to output an indicating signal for degaussing the CRT of a display monitor by means of an indicating-signals-outputting means thereof through a communicating means for communicating with the display monitor, such an effect can be obtained as the degaussing of the CRT can be done at the hands of an operator by the manipulation of a manipulation-inputting means such as a keyboard, a mouse and the like which is connected to the host computer.

Furthermore, according to the thirteenth aspect of the present invention, since a host computer is composed so as to output an indicating signal for nullifying manipulations of an adjusting means for manually adjusting the displaying state of the image-displaying means of a display monitor through a communicating means for communicating with the display monitor, such effects can be obtained as the adjusting manipulations of the display monitor made by mistake or adjusted into inappropriate situations can be nullified by the manipulation of a manipulation-inputting means such as a keyboard, a mouse and the like which is connected to the host computer, so misadjustments of an operator can be easily prevented or modified.

Furthermore, according to the fourteenth aspect of the present invention, since a host computer is composed so as to output an indicating signal for switching the image-displaying means of a display monitor through a communicating means for communicating with the display monitor, such an effect can be obtained as the image-displaying means can be shifted to an operation-waiting state of low power-consumption cheaply without complicating structures of the host computer and the display monitor itself when manipulations of a manipulation-inputting means such as a keyboard, a mouse and the like of the host computer are not done for a predetermined time period.

Furthermore according to the fifteenth aspect of the present invention, since a host computer is composed so as to output an indicating signal for switching the CRT of a display monitor to a low power-consuming state through a communicating means thereof for communicating with the display monitor, such an effect can be obtained as the CRT can be shifted to an operation-waiting state of low power-consumption by the use of a simple and cheap structure of the host computer.

Furthermore, according to the sixteenth aspect of the present invention, since a host computer is composed so as to prohibit the impression of voltages to be supplied to the deflecting and high-voltage-impressing circuit of the CRT of a display monitor by means of an indicating signal for switching the CRT to a low power-consuming state thereof, such an effect can be obtained as the CRT can be shifted to an operation-waiting state, from which the CRT can return to its ordinary operating state at once, by the indicating signal from the host computer corresponding to the manipulation of a manipulation-inputting means such as a keyboard, a mouse and the like.

Furthermore, according to the seventeenth aspect of the present invention, since a host computer is composed so as to prohibit the impression of a voltage to be supplied to the heater of the CRT of a display monitor by means of an indicating signal for switching the CRT to a low power-consuming state thereof, such an effect can be obtained as the CRT can be shifted to an operation-waiting state, in which the CRT does not consume any electric power almost perfectly, by the indicating signal from the host computer corresponding to the manipulation of a manipulation inputting means such as a keyboard, a mouse and the like.

Furthermore, according to the eighteenth aspect of the present invention, since a host computer is composed so as to transmit an indicating signal for switching the image-displaying means of a display monitor to a low power-consuming state thereof by means of a nonsynchronous type serial transmitter, such effects can be obtained as the communication of the indicating signal for shifting the display monitor to an operation-waiting state of low power-consumption from the host computer to the display monitor can be executed with a widely usable communication system using fewer communications lines and the image-displaying means of the display monitor can be shifted to the operation-waiting state of low power-consumption by the use of a simple and cheap structure of the host computer.

Furthermore, according to the nineteenth aspect of the present invention, since a host computer is composed so as to transmit an indicating signal for switching the image-displaying means of a display monitor to a low power-consuming state thereof by means of a synchronous type serial transmitter, such effects can be obtained as the communication of the indicating signal for shifting the display monitor to an operation-waiting state thereof from the host computer to the display monitor can be realized by the use of a simple controlling logic in a securely controllable communication system and the image-displaying means of the display monitor can be shifted to the operation-waiting state of low power-consumption by the use of a simple and cheap structure of the host computer.

Furthermore, according to the twentieth aspect of the present invention, since a computer system is composed so that a host computer transmits an indicating signal for degaussing the CRT of a display monitor from the host computer and that the display monitor degausses the CRT thereof on the basis of the indicating signal from the host computer, such an effect can be obtained as the degaussing of the CRT can be done at the hands of an operator by manipulating a manipulation-inputting means such as a keyboard, a mouse and the like which is connected to the host computer.

Furthermore, according to the twenty-first aspect of the present invention, since a computer system is composed so that a host computer outputs an indicating signal for nullifying manipulations of an adjusting means for manually adjusting the displaying state of the image-displaying means of a display monitor through a communicating means thereof for communicating with the display monitor and that the display monitor nullifies the manipulation of the adjusting means on the basis of the indicating signal from the host computer received by a communicating means thereof with the host computer, such effects can be obtained as adjusting manipulations of the display monitor made by mistake or adjusted into inappropriate state can be nullified by the manipulation of a manipulation-inputting means such as a keyboard, a mouse and the like which is connected to the host computer, so the misadjustments of an operator can be easily prevented or modified.

Furthermore, according to the twenty-second aspect of the present invention, since a computer system is composed so that a host computer outputs an indicating signal for switching the image-displaying means of a display monitor to a low power-consuming state thereof through a communicating means thereof for communicating with the display monitor and that the display monitor switches the image-displaying means to the low power-consuming state on the basis of the indicating signal from the host computer received by a communicating means thereof with the host computer, such effects can be obtained as the image-displaying means can be shifted to an operation-waiting state of low power-consumption cheaply without complicating the structures of the host computer and the display monitor when the manipulations of a manipulation-inputting means such as a keyboard, a mouse and the like of the host computer are not done for a predetermined time period.

Furthermore, according to the twenty-third aspect of the present invention, since a computer system is composed so that a host computer outputs an indicating signal for switching the CRT of a display monitor to a low power-consuming state thereof through a communicating means thereof for communicating with the display monitor and that the display monitor switches the CRT to the low power consuming state on the basis of the indicating signal from the host computer received by a communicating means thereof with the host computer, such an effect can be obtained as the CRT can be shifted to an operation-waiting state of low power-consumption by the use of simple and cheap structures of the host computer and the display monitor.

Furthermore, according to the twenty-fourth aspect of the present invention, since a computer system is composed so that an indicating signal from a host computer for switching the CRT of a display monitor to a low power-consuming state thereof prohibits impressing voltages to be supplied to the deflecting and high-voltage-impressing circuit of the CRT, such an effect can be obtained as the CRT can be shifted to an operation-waiting state, from which the CRT can return to its ordinary operating state at once, by the indicating signal from the host computer corresponding to the manipulation of a manipulation-inputting means such as a keyboard, a mouse and the like.

Furthermore, according to the twenty-fifth aspect of the present invention, since a computer system is composed so that an indicating signal from a host computer for switching the CRT of a display monitor to a low power-consuming state thereof prohibits impressing a voltage to be supplied to the heater of the CRT, such an effect can be obtained as the CRT can be shifted to an operation-waiting state, in which the CRT does not consume any electric power almost perfectly, by the indicating signal from the host computer corresponding to the manipulation of a manipulation-inputting means such as a keyboard, a mouse and the like.

Furthermore, according to the twenty-sixth aspect of the present invention, since a computer system is composed so that a communicating means of a display monitor and a communicating means of a host computer transmits an indicating signal for switching the image-displaying means of the display monitor to a low power-consuming state thereof by the use of a asynchronous type serial communication system, such effects can be obtained as the communication of the indicating signal for shifting the display monitor to an operation-waiting state of low power-consumption thereof from the host computer to the display monitor can be executed with a widely usable communication system using fewer communications lines and the image-displaying means of the display monitor can be shifted to the operation-waiting state of low power-consumption by the use of simple and cheap structures of the host computer and the display monitor.

Furthermore, according to the twenty-seventh aspect of the present invention, since a computer system is composed so that a communicating means of a display monitor and a communicating means of a host computer transmits an indicating signal for switching the image-displaying means of the display monitor to a low power-consuming state thereof by the use of a synchronous type serial communication system, such effects can be obtained as the communication of the indicating signal for shifting the display monitor to an operation-waiting state thereof from the host computer to the display monitor can be realized by means of a simple controlling logic in a securely controllable communication system and the image-displaying means of the display monitor can be shifted to the operation-waiting state of low power-consumption by the use of simple and cheap structures of the host computer and the display monitor.

Furthermore, according to the twenty-eighth aspect of the present invention, since a computer system is composed so that at least one selection image between the selection image for degaussing the CRT of a display monitor and the selection image for nullifying manipulations of an adjusting means for manually adjusting the displaying state of the displaying faceplate of the CRT is displayed on the CRT and that one of the selection images is selected by the manipulation of a manipulation-inputting means for manually inputting indicating signals, such effects can be obtained as either or both of the selection images of degaussing the CRT and nullifying the adjusting manipulations of the CRT displayed on the CRT can be easily selected by the manipulation-inputting means such as a keyboard, a mouse and the like and the manipulations of the degaussing or the nullifying of the adjusting manipulations at the hands of an operator can be done quickly and easily.

Furthermore, according to the twenty-ninth aspect of the present invention, since a control method of a computer system is composed so as to input an indicating signal for degaussing the CRT of a display monitor to a host computer, and to transmit the inputted indicating signal from the host computer to the display monitor, and further to degauss the CRT on the basis of the transmitted indicating signal, such an effect can be obtained as the degaussing of the CRT can be done at the hands of an operator by manipulating a manipulation-inputting means such as a keyboard, a mouse and the like which is connected to the host computer.

Furthermore, according to the thirtieth aspect of the present invention, since a controlling method of a computer system is composed so as to input an indicating signal for nullifying adjusting manipulations for adjusting the displaying state of the displaying faceplate of the image-displaying means of a display monitor to a host computer, and to transmit the inputted indicating signal from the host computer to the display monitor, and further to nullify the adjusting manipulations for adjusting the displaying state of the displaying faceplate of the image-displaying means on the basis of the transmitted indicating signal, such effects can be obtained as the adjusting manipulations of the display monitor made by mistake or adjusted into inappropriate state can be nullified by the manipulation of a manipulation-inputting means such as a keyboard, a mouse and the like which is connected to the host computer, so the misadjustments of an operator can be easily prevented or modified.

Furthermore, according to the thirty-first aspect of the present invention, since a controlling method of a computer system is composed so as to generate an indicating signal for switching the image-displaying means of a display monitor to a low power-consuming state thereof when manipulation-inputting to a host computer is not done for a predetermined time period, and to transmit the generated indicating signal from the host computer to the display monitor, and further to switch the image-displaying means to a low power-consuming state thereof on the basis of the transmitted indicating signal, such an effect can be obtained as the image-displaying means can be shifted to an operation-waiting state of low power-consumption cheaply without complicating structures of the host computer and the display monitor when the manipulations of a manipulation-inputting means such as a keyboard, a mouse and the like of the host computer are not done for the predetermined time period.

Furthermore, according to the thirty-second aspect of the present invention, since a control method of a computer system is composed so as to generate an indicating signal for switching the CRT of a display monitor to a low power-consuming state thereof when manipulation-inputting to a host computer is not done for a predetermined time, and to transmit the generated indicating signal from the host computer to the display monitor, and further to switch the CRT to a low power-consuming state thereof on the basis of the transmitted indicating signal, such an effect can be obtained as the CRT can be shifted to an operation-waiting state of low power-consumption by the use of simple and cheap structures of the host computer and the display monitor.

Furthermore, according to the thirty-third aspect of the present invention, since a control method of a computer system is composed so that impressing voltages to be supplied to the deflecting and high-voltage-impressing circuit of the CRT of a display monitor is prohibited by an indicating signal from a host computer for switching the CRT to a low power-consuming state thereof when manipulation-inputting to the host computer is not done for a predetermined time period, such an effect can be obtained as the CRT can be shifted to an operation-waiting state thereof, from which the CRT can return to its ordinary operating state at once, by the indicating signal from the host computer corresponding to the manipulation of a manipulation-inputting means such as a keyboard, a mouse and the like by the use of simple and cheap structures of the host computer and the display monitor.

Furthermore, according to the thirty-fourth aspect of the present invention, since a control method of a computer system is composed so that impressing a voltage to be supplied to the heater of the CRT of a display monitor is prohibited by an indicating signal from a host computer for switching the CRT to a low power-consuming state thereof when manipulation-inputting to the host computer is not done for a predetermined time period, such an effect can be obtained as the CRT can be shifted to an operation-waiting state, in which the CRT does not consume any electric power almost perfectly, by the indicating signal from the host computer corresponding to the manipulation of a manipulation-inputting means such as a keyboard, a mouse and the like by the use of simple and cheap structures of the host computer and the display monitor.

Furthermore, according to the thirty-fifth aspect of the present invention, since a control method of a computer system is composed so that an indicating signal from a host computer for switching the image-displaying means of a display monitor to a low power-consuming state thereof when manipulation-inputting to the host computer is not done for a predetermined time period is transmitted from the host computer to the display monitor by means of an asynchronous type serial communication system, such effects can be obtained as the transmission of the indicating signal for shifting the display monitor to an operation-waiting state of low power-consumption thereof from the host computer to the display monitor can be executed with a widely usable communication system using fewer communications lines and the image-displaying means can be shifted to the operation-waiting state of low power-consumption by the use of simple and cheap structures of the host computer and the display monitor.

Furthermore, according to the thirty-sixth aspect of the present invention, since a control method of a computer system is composed so that an indicating signal from a host computer for switching the image-displaying means of a display monitor to a low power-consuming state thereof when manipulation-inputting to the host computer is not done for a predetermined time period is transmitted from the host computer to the display monitor by means of a synchronous type serial communication system, such effects can be obtained as the transmission of the indicating signal for shifting the display monitor to an operation-waiting state thereof from the host computer to the display monitor can be realized by means of a simple controlling logic in a securely controllable communication system and the image-displaying means can be shifted to the operation-waiting state of low power-consumption thereof by the use of simple and cheap structures of the host computer and the display monitor.

While preferred embodiments of the invention have been described by the use of specific terms, such description is for illustrative purposes only, and it is to be understood that changes and variations may be made without departing from the spirit or scope of the following claims.

What is claimed is:

1. An image display apparatus comprising a cathode ray tube for displaying an image, a video-signal-supplying means for supplying a video signal to the cathode ray tube, a driving-voltage-impressing means for impressing a driving voltage for driving said cathode ray tube on the cathode ray tube, a degaussing means for degaussing the cathode ray tube, a communicating means for communicating with a computer apparatus, and a controlling means for controlling said degaussing means on the basis of a transmitted signal generated by said computer apparatus in response to an instruction input by an operator, said transmitted signal being received by the communicating means.

2. The image display apparatus according to claim 1 wherein said transmitted signal is a degaussing-indicating signal.

3. An image display apparatus comprising an image-displaying means for displaying an image, a video-signal-supplying means for supplying a video signal to the image-displaying means, a driving-voltage-impressing means for impressing a driving voltage for driving said image-displaying means on the image-displaying means, an adjusting means for manually adjusting a displaying state of a displaying faceplate of the image-displaying means, a communicating means for communicating with a computer apparatus, and a controlling means for nullifying manipulations of said adjusting means on the basis of a transmitted signal from said computer apparatus received by the communicating means.

4. The image display apparatus according to claim 3 wherein said transmitted signal is a manipulation-input-prohibition-indicating signal.

5. An image display apparatus comprising an image-displaying means for displaying an image, a video-signal-supplying means for supplying a video signal to the image-displaying means, a driving-voltage-impressing means for impressing a driving voltage for driving said image-displaying means on the image-displaying means, a switching means for switching the image-displaying means to a low power-consuming state thereof, a communicating means for communicating with a computer apparatus, and a controlling means for controlling said switching means on the basis of a transmitted signal generated by said computer apparatus in response to an instruction input by an operator, said transmitted signal being received by the communicating means.

6. The image display apparatus according to any one of claims 3 or 5 wherein said image-displaying means is a cathode ray tube.

7. The image display apparatus according to claim 6 wherein said transmitted signal is an output-prohibition-indicating signal for prohibiting output of an output voltage to be supplied to deflecting and high-voltage impressing circuit of said cathode ray tube among output voltages of said driving-voltage-impressing means.

8. The image display apparatus according to claim 6 wherein said transmitted signal is an output-prohibition-indicating signal for prohibiting output of an output voltage to be supplied to a heater of said cathode ray tube among output voltages of said driving-voltage-impressing means.

9. The image display apparatus according to any one of claims 1, 3, or 5 wherein said communicating means is an asynchronous type serial-parallel converter.

10. The image display apparatus according to any one of claims 1, 3, or 5 wherein said communicating means is a synchronous type serial-parallel converter.

11. The image display apparatus according to any one of claims 1, 3, or 5 wherein said communicating means is a synchronous-and-asynchronous-combined type serial-parallel converter.

12. A computer apparatus comprising a central controlling means for executing various operations, a memorizing means for memorizing a program controlling the operation of the central controlling means and various data, a terminal-controlling means for controlling the operation of various terminals on the basis of indications of said central controlling means, a communicating means for communicating with an image display apparatus on the basis of indications of said central controlling means, and an indicating-signal-outputting means for outputting an indicating signal to said image display apparatus through said communicating means for degaussing a cathode ray tube of said image display in response to an instruction input by all operator.

13. A computer apparatus comprising a central controlling means for executing various operations, a memorizing means for memorizing a program controlling the operation of the central controlling means and various data, a terminal-controlling means for controlling the operation of various terminals on the basis of indications of said central controlling means, a communicating means for communicating with an image display apparatus on the basis of indications of said central controlling means, and an indicating-signal-outputting means for outputting an indicating signal nullifying manipulations of an adjusting means for manually adjusting a displaying state of an image-displaying means of said image display apparatus through said communicating means.

14. A computer apparatus comprising a central controlling means for executing various operations, a memorizing means for memorizing a program controlling the operation of the central controlling means and various data, a terminal-controlling means for controlling the operation of various terminals on the basis of indications of said central controlling means, a communicating means for communicating with an image display apparatus on the basis of indications of said central controlling means, and an indicating-signal-outputting means outputting an indicating signal to said image display apparatus through said communicating means for switching an image-displaying means of said image display apparatus to a low power-consuming state thereof.

15. The computer apparatus according to claims 13 or 14 wherein said image-displaying means is a cathode ray tube.

16. The computer apparatus according to claim 15 wherein said indicating signal is an indicating signal prohibiting impressing a voltage to be supplied to a deflecting and high-voltage-impressing circuit of said cathode ray tube.

17. The computer apparatus according to claim 15 wherein said indicating signal is an indicating signal prohibiting impressing a voltage to be supplied to a heater of said cathode ray tube.

18. The computer apparatus according to any one of the claims 12, 13 or 14 wherein said communicating means is an asynchronous type serial transmitter.

19. The computer apparatus according to any one of the claims 12, 13 or 14 wherein said communicating means is a synchronous type serial transmitter.

20. A computer system comprising:

an image display apparatus comprising a cathode ray tube for displaying an image, a video-signal-supplying means for supplying a video signal to the cathode ray tube, a driving-voltage-impressing means impressing a driving voltage for driving said cathode ray tube on the cathode ray tube, and a degaussing means for degaussing the cathode ray tube;

a computer apparatus including a central controlling means for executing various operations, a memorizing means memorizing a program controlling the operation of the central controlling means and various data, a terminal-controlling means for controlling the operation of various terminals on the basis of indications of said central controlling means, and a communicating means for communicating said said image display apparatus on the basis of indications of said central controlling means an indicating-signal-outputting means for outputting an indicating signal to said image display apparatus through said communicating means for degaussing said cathode ray tube in response to an instruction input by an operator and wherein said image display apparatus further comprises a communicating means for communicating with said computer apparatus and a controlling means for controlling said degaussing means on the basis of said indicating signal from said computer apparatus received by the communicating means.

21. A computer system comprising:

an image display apparatus comprising an image-displaying means for displaying an image, a video-signal-Supplying means for supplying a video signal to the image-displaying means, a driving-voltage-impressing means for impressing a driving voltage for driving said image-displaying means on the image-displaying means, and an adjusting means for manually adjusting a displaying means;

a computer apparatus comprising a central controlling means for executing various operations, a memorizing means for memorizing a program controlling the operation of the central controlling means and various data, a terminal-controlling means for controlling the operation of various terminals on the basis of indications of said central controlling means, and a communicating means for communicating with an image display apparatus on the basis of indications of said central controlling means; an indicating-signal-outputting means for outputting an indicating signal nullifying manipulations of said adjusting means of said image display apparatus through said communicating means, and wherein said image display apparatus further comprises a communicating means for communicating with said computer apparatus and a control means for nullifying said manipulations of said adjusting means on the basis of an indicating signal from said computer apparatus received by the communicating means.

22. A computer system comprising:

an image display apparatus comprising an image-displaying means for displaying an image, a video-signal-supplying means for supplying a video signal to the image-displaying means, a driving-voltage-impressing means for impressing a driving voltage for driving said image-displaying means on the image-display means, and a switching means for switching the image-displaying means to a low power-consuming state thereof;

a computer apparatus including a central controlling means for executing various operations, a memorizing means for memorizing a program controlling the operation of the central controlling means and various data, a terminal-controlling means for controlling the operation of various terminals on the basis of indications of said central controlling means, a communicating means for communicating with an image display apparatus on the basis of indications of said central controlling means; an indicating-signal-outputting means for outputting an indicating signal switching said image-displaying means to the low power-consuming state thereof through said communicating means, and wherein said image display apparatus further comprises a communicating means for communicating with said computer apparatus, and a controlling means for controlling said switching means on the basis of said indicating signal of said computer apparatus.

23. The computer system according to any one of claims 21 or 22 wherein said image-displaying means is a cathode ray tube.

24. The computer system according to claim 23 wherein said indicating signal is an indicating signal prohibiting impressing a voltage to be supplied to a deflecting and high-voltage-impressing circuit of said cathode ray tube.

25. The computer system according to claim 23 wherein said indicating signal is an indicating signal prohibiting impressing a voltage to be supplied to a heater of said cathode ray tube.

26. The computer system according to any one of the claims 20, 21 or 22 wherein said communicating means of said image display apparatus and said communicating means of said computer apparatus use an asynchronous type serial communication system.

27. The computer system according to any one of the claims 20, 21 or 22 wherein said communicating means of said image display apparatus and said communicating means of said computer apparatus use a synchronous type serial communication system.

28. A computer system comprising:

an image display apparatus having a cathode ray tube for displaying an image, a degaussing means for degaussing the cathode ray tube, and an adjusting means for manually adjusting a displaying state of a displaying faceplate of said cathode ray tube; a computer apparatus for controlling said image display apparatus;

a manipulation-inputting means for manually inputting an indicating signal to said computer apparatus;

a displaying means for displaying at least one selection image between a selection image for degaussing said cathode ray tube and a selection image for nullifying manipulations of said adjusting means on said cathode ray tube, and a selecting means for selecting one of said selection images by manipulating said manipulation-inputting means.

29. A controlling method for controlling a computer system for displaying an image on a cathode ray tube of an image display apparatus on the basis of an indicating signal from a computer apparatus, said method comprising the steps of: inputting, by an operator an instruction signal for degaussing said cathode ray tube to said computer apparatus, transmitting said indicating signal input by means of the inputting step from said computer apparatus to said image display apparatus, and immediately degaussing said cathode ray tube on the basis of said indicating signal transmitted by means of the transmitting step.

30. A controlling method for controlling a computer system for displaying an image on an image-displaying means of an image display apparatus on the basis of an indicating signal from a computer apparatus, the method comprising the steps of: inputting an indicating signal for nullifying an adjusting manipulation adjusting a displaying state of a displaying faceplate of said image-displaying means to said computer apparatus, transmitting said indicating signal inputted by means of the inputting step from said computer apparatus to said image display apparatus, and nullifying an adjusting manipulation adjusting said displaying state of said displaying faceplate of said image-displaying means on the basis of said indicating signal transmitted by means of the transmitting step.

31. A controlling method for controlling a computer system for displaying an image on an image-displaying means of an image display apparatus on the basis of an indicating signal from a computer apparatus, said method comprising the steps of: generating an indicating signal for switching said image-displaying means to a low power-consuming state thereof when manipulation-inputting to said computer apparatus is not detected for a predetermined time period, transmitting said indicating signal generated by means of the generating step from said computer apparatus to said image display apparatus, and switching said image-displaying means to the low power-consuming state thereof on the basis of said indicating signal transmitted by means of the transmitting step.

32. The controlling method according to any one of claims 30 or 31 wherein said image-displaying means is a cathode ray tube.

33. The controlling method according to claim 32 wherein said indicating signal is an indicating signal for prohibiting impressing a voltage to be supplied to a deflecting and high-voltage-impressing circuit of said cathode ray tube.

34. The controlling method according to claim 32 wherein said indicating signal is an indicating signal for prohibiting impressing a voltage to be supplied to a heater of said cathode ray tube.

35. The controlling method according to any one of the claims 29, 30 or 31 wherein said transmitting step transmits said indicating signal by means of an asynchronous type serial communication system.

36. The controlling method according to any one of the claims 29, 30 or 31 wherein said transmitting step transmits aid indicating signal by means of a synchronous type serial communication system.

* * * * *